(12) United States Patent
Cho

(10) Patent No.: US 9,880,637 B2
(45) Date of Patent: Jan. 30, 2018

(54) HUMAN INTERFACE APPARATUS HAVING INPUT UNIT FOR POINTER LOCATION INFORMATION AND POINTER COMMAND EXECUTION UNIT

(71) Applicant: INNOPRESSO, INC., Seoul (KR)

(72) Inventor: Eunhyung Cho, Seoul (KR)

(73) Assignee: INNOPRESSO, INC., Seoul (KR)

( * ) Notice: Subject to any disclaimer, the term of this patent is extended or adjusted under 35 U.S.C. 154(b) by 0 days.

(21) Appl. No.: 15/475,045

(22) Filed: Mar. 30, 2017

(65) Prior Publication Data

US 2017/0205896 A1   Jul. 20, 2017

Related U.S. Application Data

(63) Continuation of application No. 14/718,105, filed on May 21, 2015, now Pat. No. 9,639,173, which is a (Continued)

(30) Foreign Application Priority Data

| May 28, 2012 | (KR) | 10-2012-0056427 |
| Jun. 8, 2012 | (KR) | 10-2012-0061197 |
| Jul. 9, 2012 | (KR) | 10-2012-0074248 |
| Sep. 20, 2012 | (KR) | 10-2012-0104272 |
| Oct. 6, 2012 | (KR) | 10-2012-0110998 |
| Nov. 8, 2012 | (KR) | 10-2012-0125755 |
| Nov. 15, 2012 | (KR) | 10-2012-0129166 |
| Dec. 24, 2012 | (KR) | 10-2012-0152644 |
| Dec. 28, 2012 | (KR) | 10-2012-0156853 |

(51) Int. Cl.
G06F 3/033   (2013.01)
G06F 3/02    (2006.01)
G06F 3/044   (2006.01)

(52) U.S. Cl.
CPC .......... *G06F 3/0213* (2013.01); *G06F 3/0227* (2013.01); *G06F 3/044* (2013.01); *G06F 2203/0381* (2013.01)

(58) Field of Classification Search
CPC ...... G06F 3/0213; G06F 3/0227; G06F 3/044; G06F 2203/0381
See application file for complete search history.

(56) References Cited

U.S. PATENT DOCUMENTS

| 5,675,361 A | 10/1997 | Santilli |
| 5,694,123 A | 12/1997 | Selker |

(Continued)

FOREIGN PATENT DOCUMENTS

| JP | 06-324838 A | 11/1994 |
| KR | 10-1999-0048975 A | 7/1999 |

(Continued)

OTHER PUBLICATIONS

International Search Report in International Application No. PCT/KR2012/011822, dated Apr. 10, 2013.

*Primary Examiner* — Peter D McLoone
(74) *Attorney, Agent, or Firm* — Park, Kim & Suh, LLC

(57) ABSTRACT

A human interface apparatus comprising the steps of: receiving text input from a user; switching to input mode for pointing location information; receiving input for pointing location information from the user; and switching the human interface apparatus to a text input mode, wherein the text input area and the pointing location information input area have at least a part of the area in common.

7 Claims, 15 Drawing Sheets

Related U.S. Application Data continuation of application No. 14/403,998, filed as application No. PCT/KR2012/011822 on Dec. 29, 2012, now Pat. No. 9,612,666.

(56) References Cited

U.S. PATENT DOCUMENTS

| | | |
|---|---|---|
| 5,864,334 A | 1/1999 | Sellers |
| 6,262,785 B1 | 7/2001 | Kim |
| 6,288,707 B1 | 9/2001 | Philipp |
| 6,911,972 B2 | 6/2005 | Brinjes |
| 7,538,759 B2 | 5/2009 | Newton |
| 7,659,887 B2 | 2/2010 | Larsen |
| 8,610,668 B2 | 12/2013 | Lee |
| 8,686,946 B2 | 4/2014 | Suggs |
| 8,860,693 B2 | 10/2014 | Elias |
| 8,866,744 B2 | 10/2014 | Yang |
| 8,890,842 B2 | 11/2014 | Wilson |
| 8,970,498 B2 | 3/2015 | Suggs |
| 9,041,652 B2 | 5/2015 | Elias |
| 2002/0171633 A1 | 11/2002 | Brinjes |
| 2005/0248540 A1 | 11/2005 | Newton |
| 2007/0091070 A1 | 4/2007 | C. Larsen |
| 2009/0113090 A1 | 4/2009 | Hochgesang |
| 2009/0256802 A1 | 10/2009 | Lou |
| 2009/0309841 A1 | 12/2009 | Wilson |
| 2010/0148995 A1 | 6/2010 | Elias |
| 2010/0149099 A1 | 6/2010 | Elias |
| 2010/0259482 A1 | 10/2010 | Ball |
| 2011/0006991 A1 | 1/2011 | Elias |
| 2011/0096513 A1 | 4/2011 | Kim |
| 2011/0241997 A1 | 10/2011 | Yang |
| 2012/0032887 A1 | 2/2012 | Chiu |
| 2012/0044146 A1 | 2/2012 | Stewart |
| 2012/0081283 A1 | 4/2012 | Lee |
| 2012/0256839 A1 | 10/2012 | Suggs |
| 2012/0274567 A1 | 11/2012 | Suggs |
| 2013/0063285 A1 | 3/2013 | Elias |
| 2013/0063286 A1 | 3/2013 | Elias |
| 2013/0063356 A1 | 3/2013 | Martisauskas |
| 2013/0100035 A1 | 4/2013 | Papakipos |

FOREIGN PATENT DOCUMENTS

| | | |
|---|---|---|
| KR | 10-2007-0117984 A | 12/2007 |
| KR | 10-2010-0033214 A | 3/2010 |

[FIG. 1]
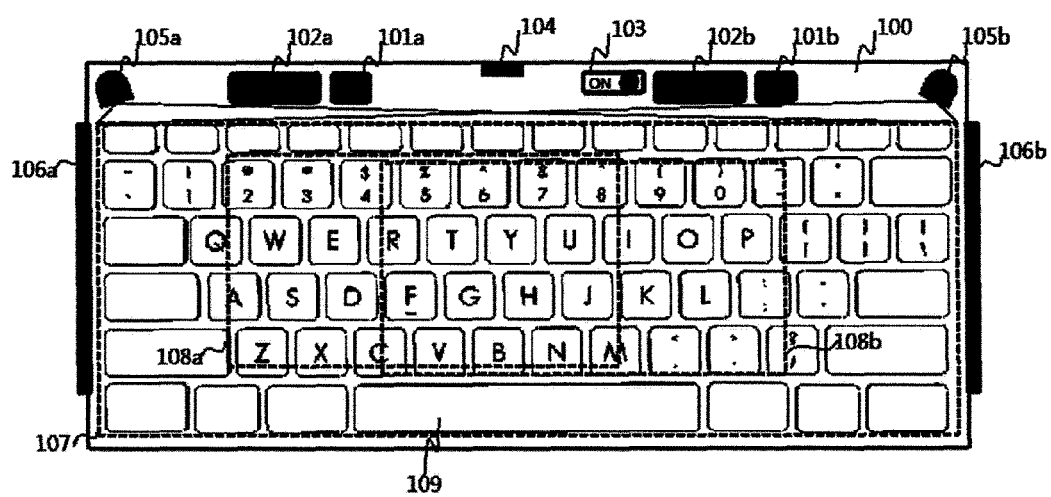

[FIG. 2]
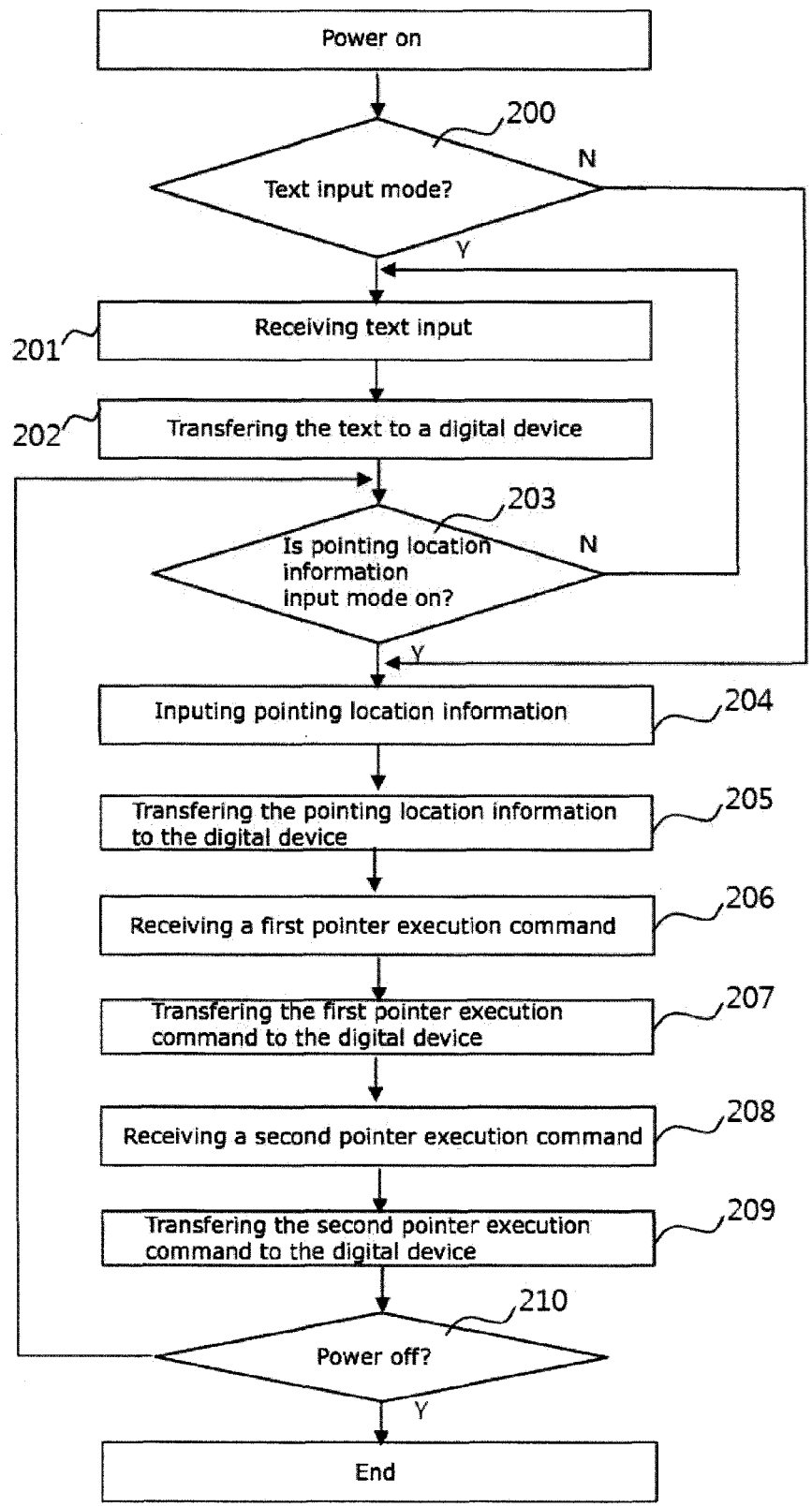

[FIG. 3]
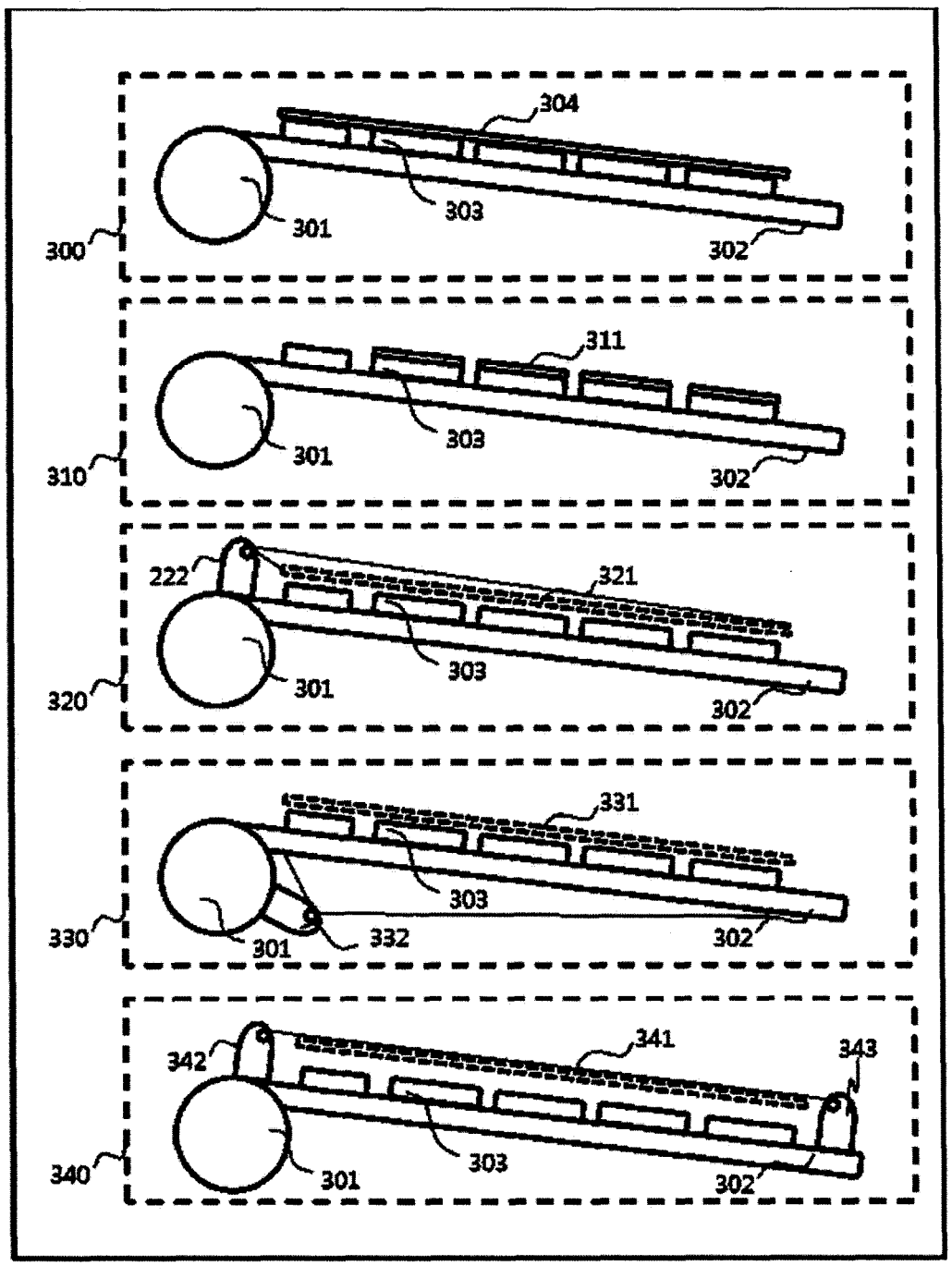

[FIG. 4]
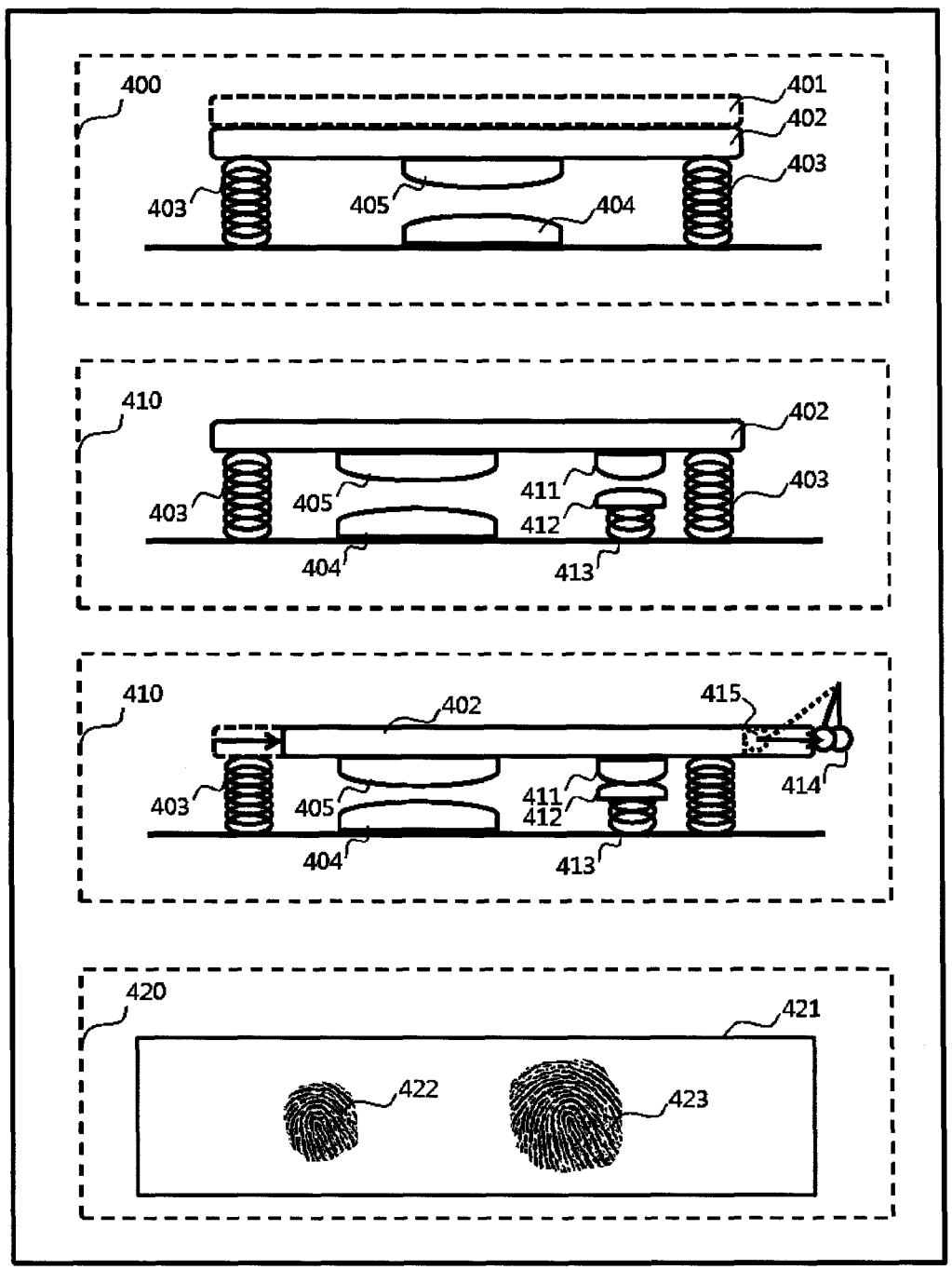

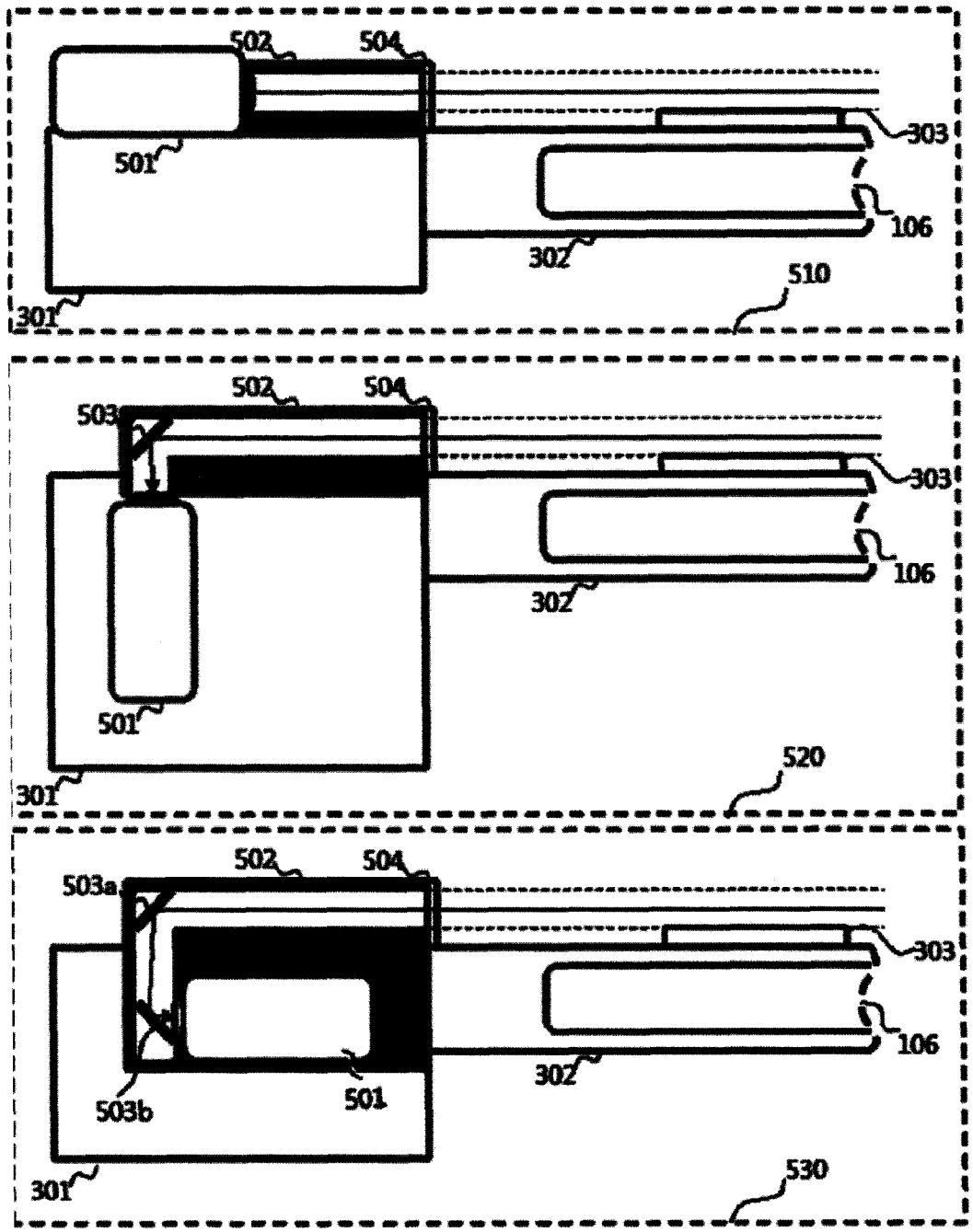
[FIG. 5]

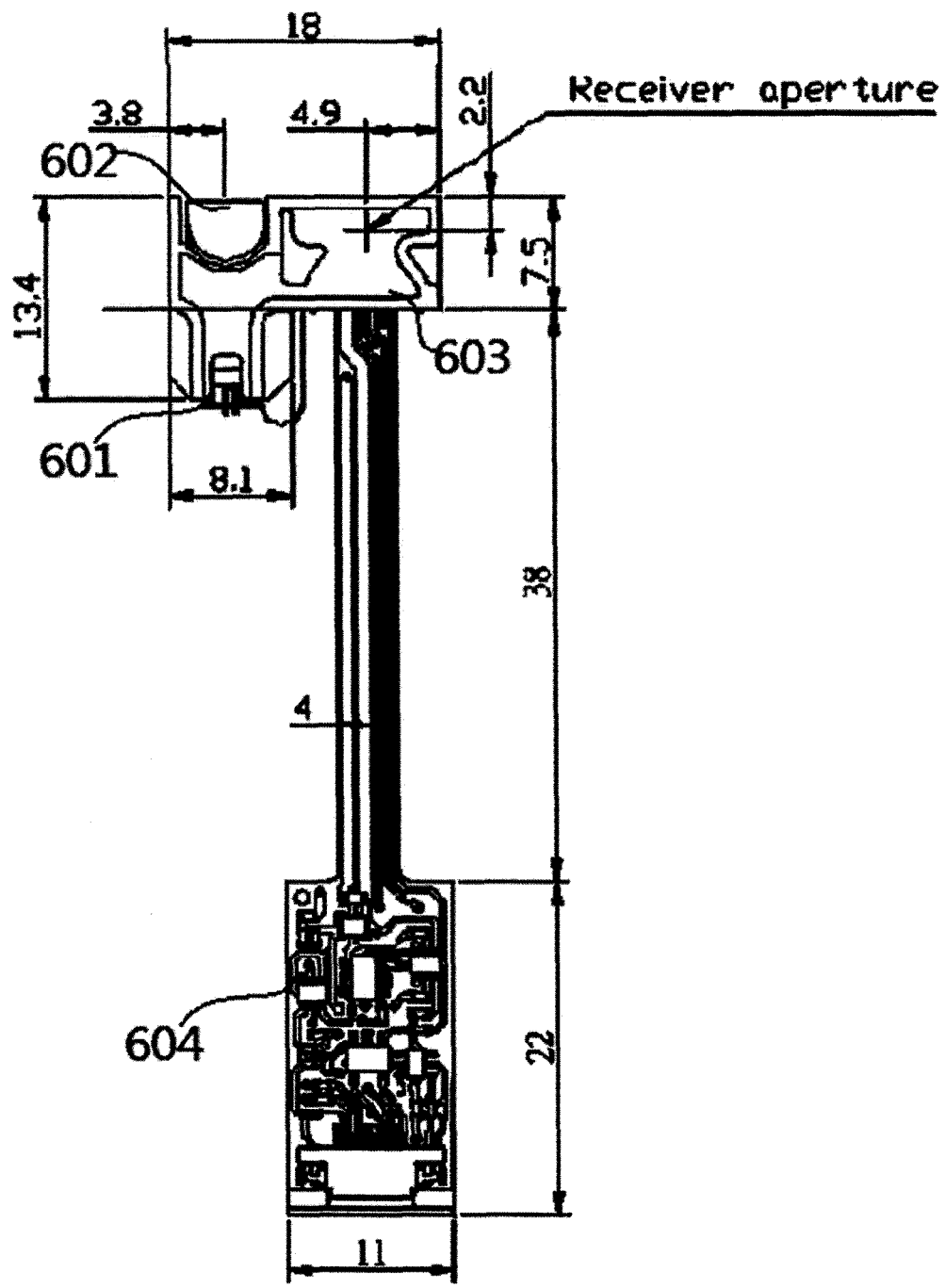
[FIG. 6]

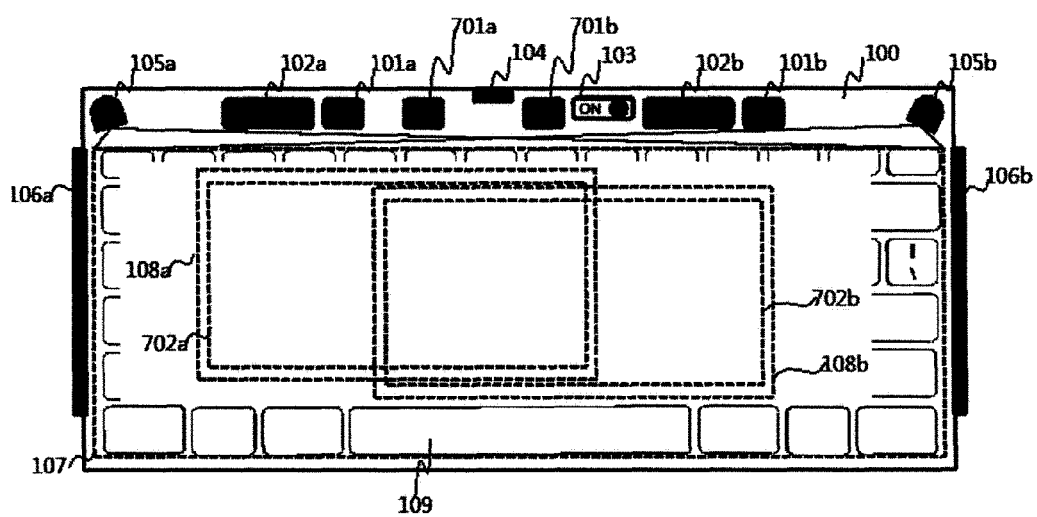
[FIG. 7]

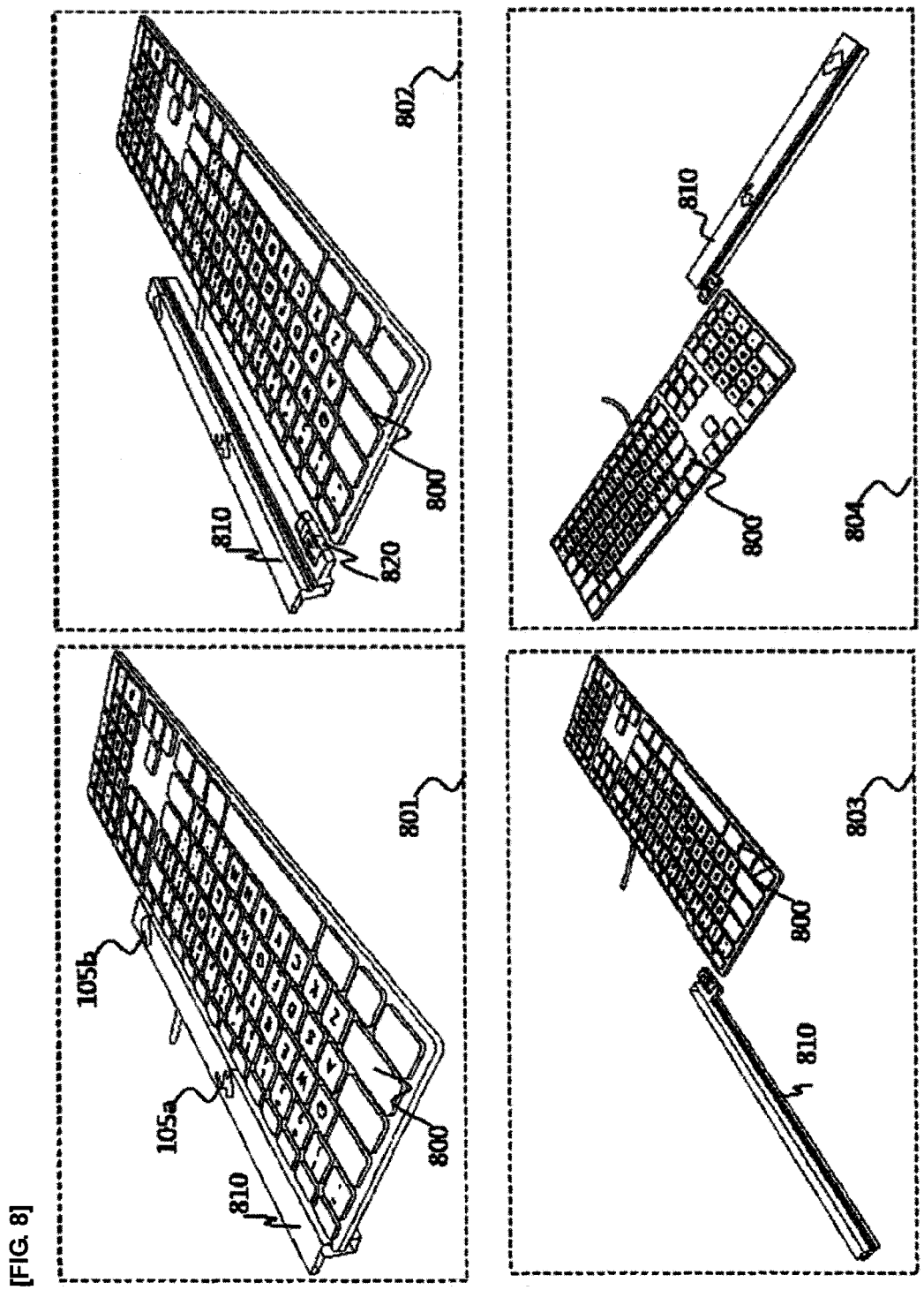

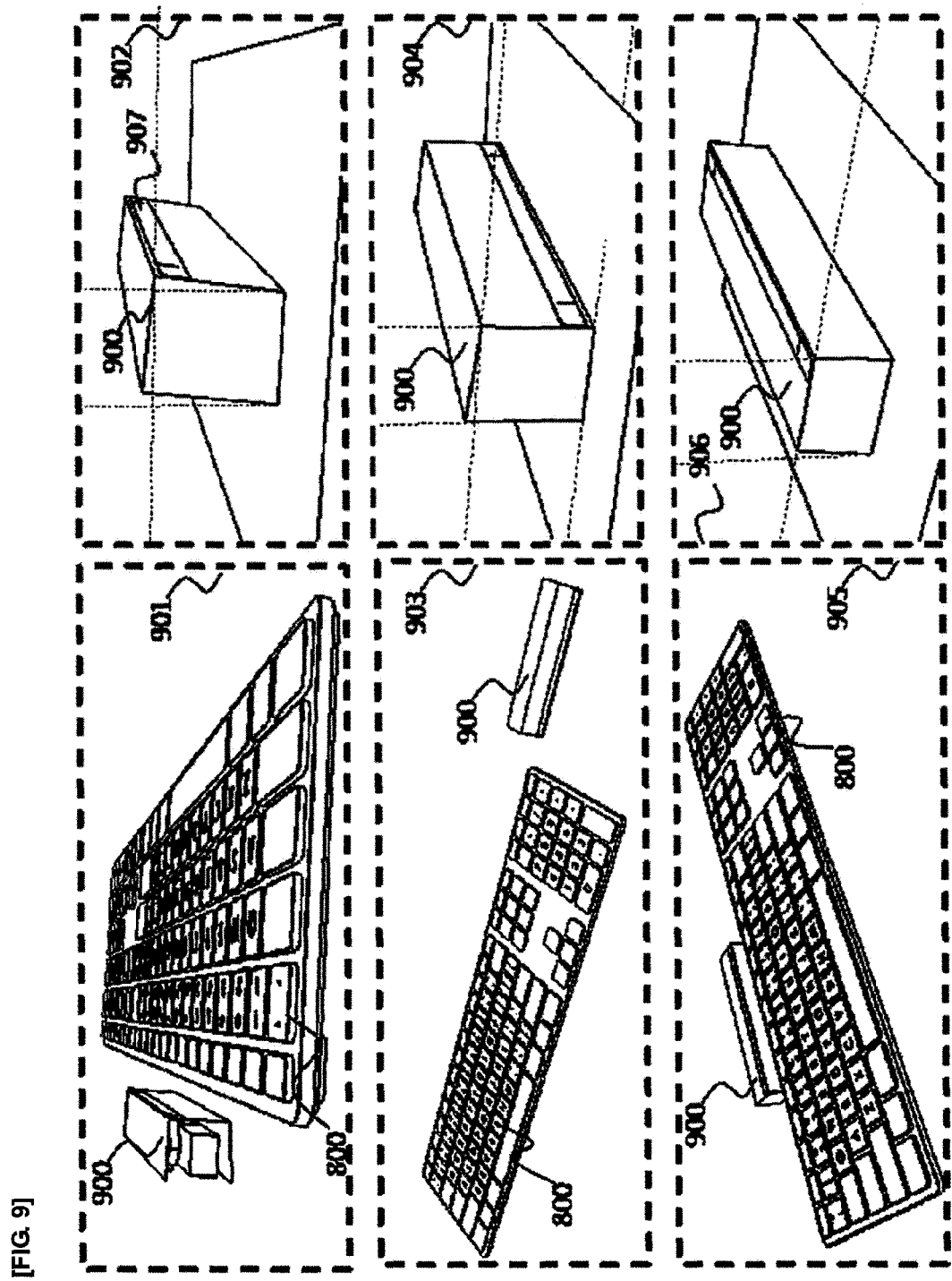

[FIG. 10]
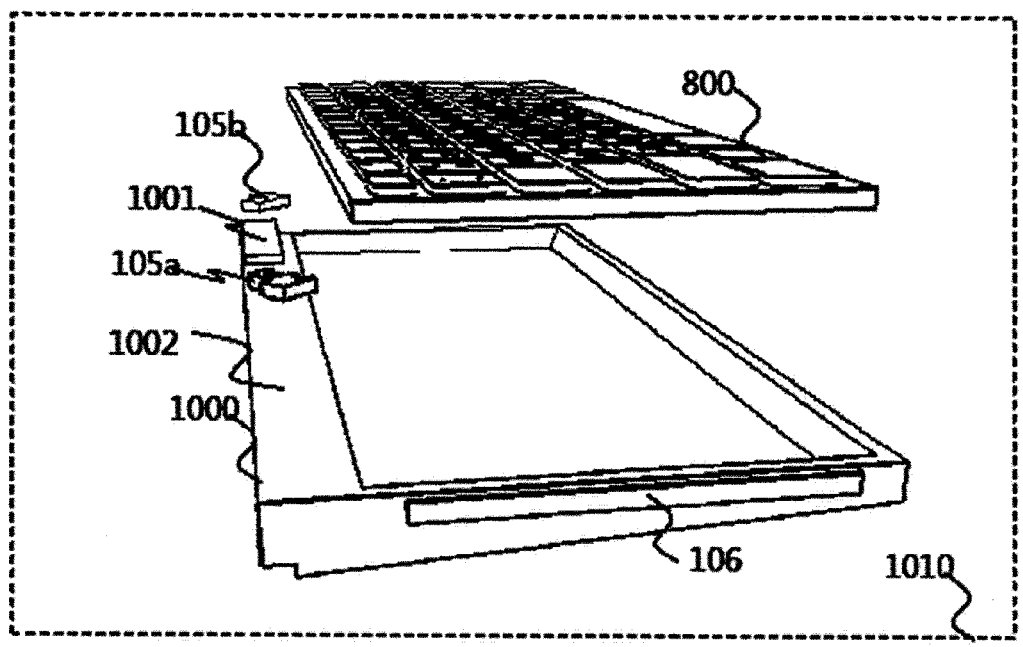
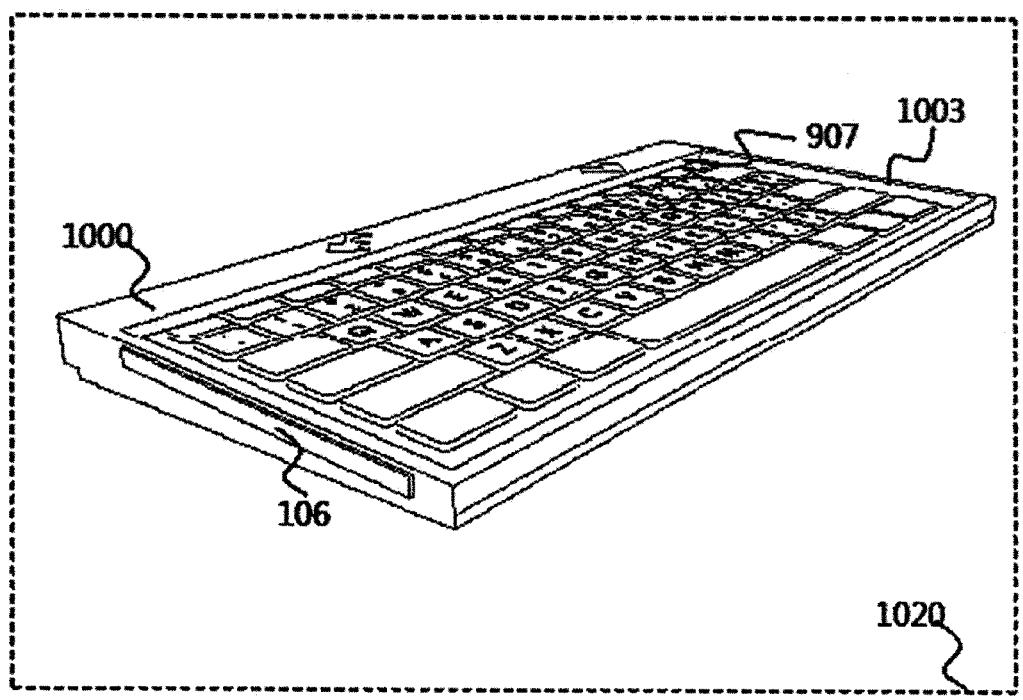

[FIG. 11]
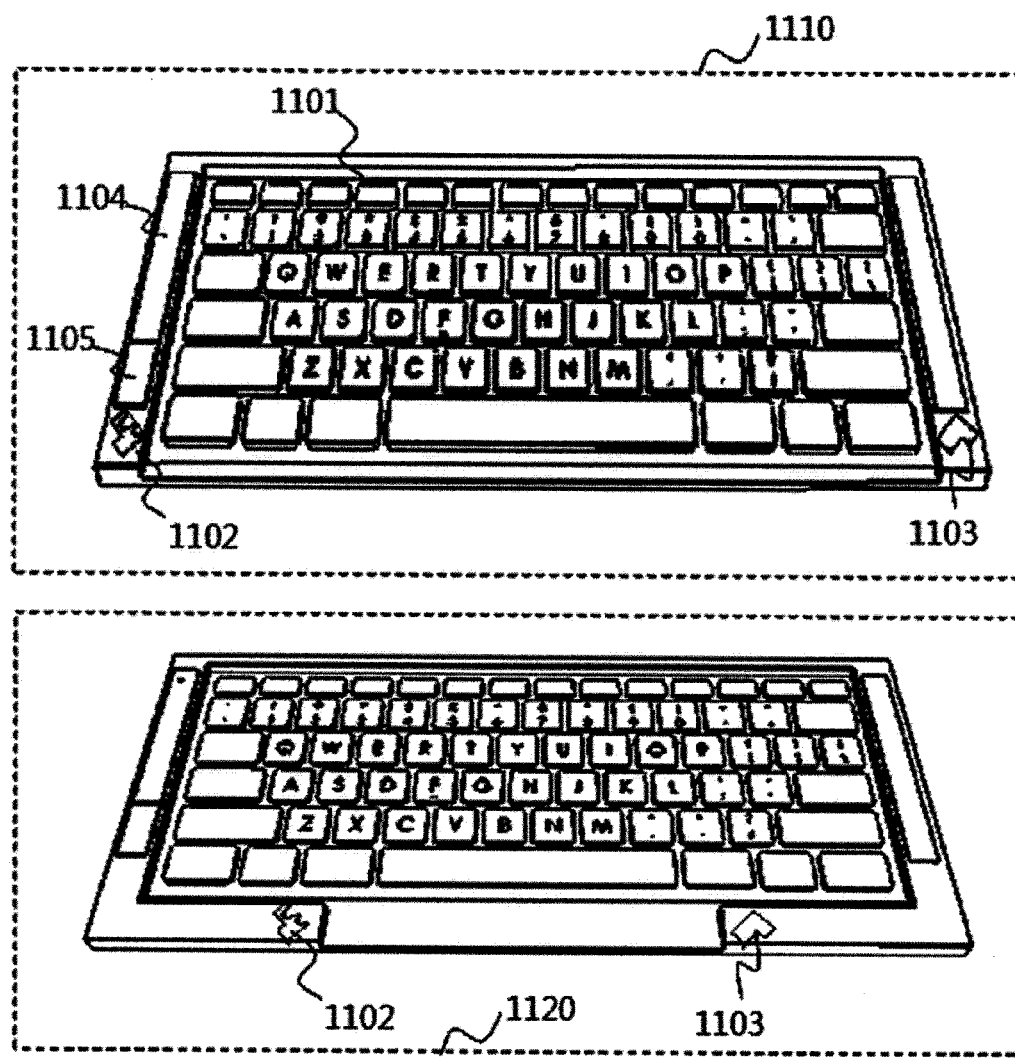

[FIG. 12]
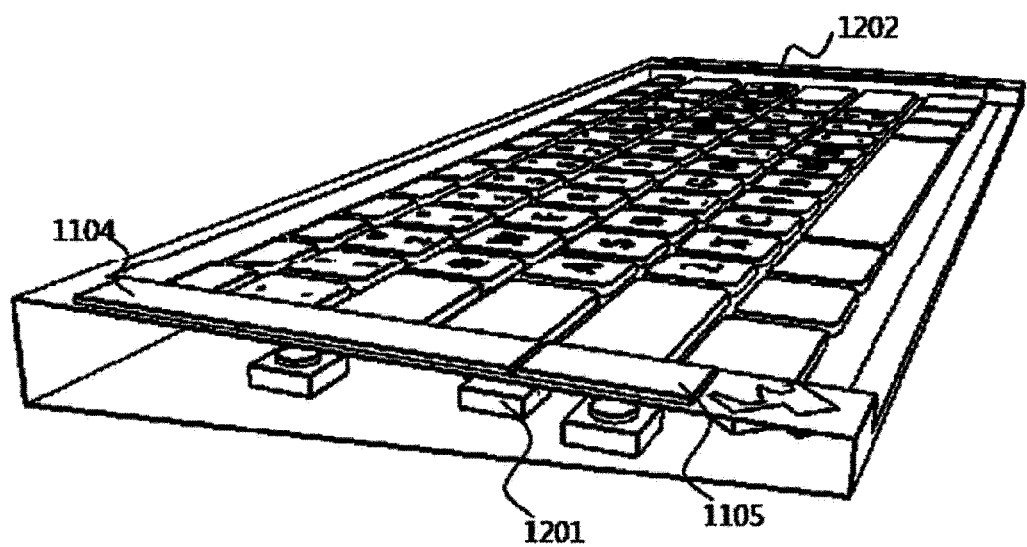

[FIG. 13]
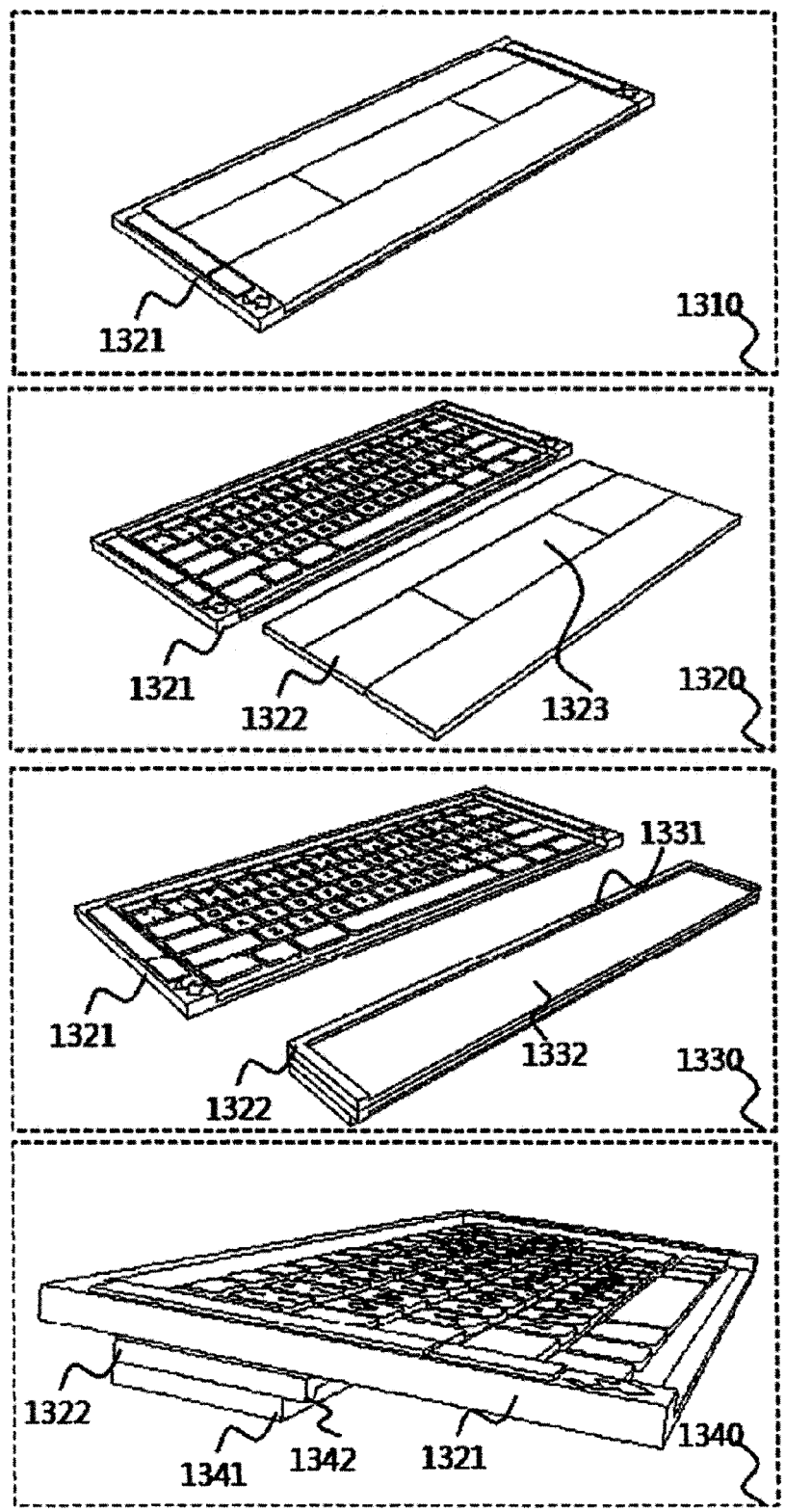

[FIG. 14]
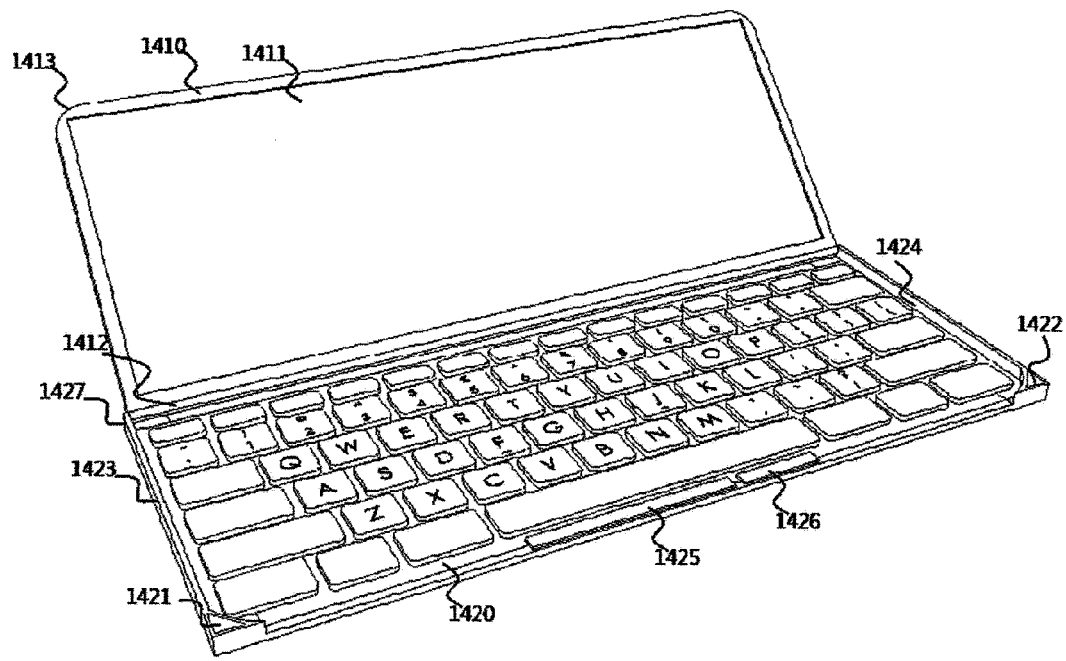

[FIG. 15]
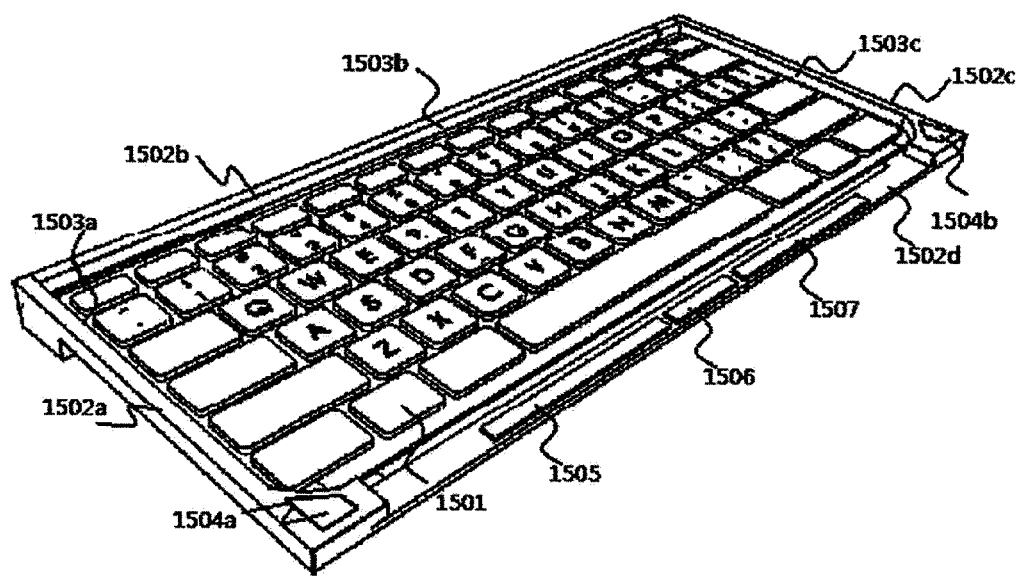

HUMAN INTERFACE APPARATUS HAVING INPUT UNIT FOR POINTER LOCATION INFORMATION AND POINTER COMMAND EXECUTION UNIT

CROSS-REFERENCE TO RELATED APPLICATION

This application is a continuation of U.S. patent application Ser. No. 14/718,105, filed on May 21, 2015, which is a continuation of U.S. patent application Ser. No. 14/403,998, filed on Nov. 25, 2014, which is the National Stage filing under 35 U.S.C. 371 of International Application No. PCT/KR2012/011822, filed on Dec. 29, 2012, which claims the benefits of Korean Patent Application No. 10-2012-0056427, filed on May 28, 2012, Korean Patent Application No. 10-2012-0061197, filed on Jun. 8, 2012, Korean Patent Application No. 10-2012-0074248, filed on Jul. 9, 2012, Korean Patent Application No. 10-2012-0104272, filed on Sep. 20, 2012, Korean Patent Application No. 10-2012-0110998, filed on Oct. 6, 2012, Korean Patent Application No. 10-2012-0125755, filed on Nov. 8, 2012, Korean Patent Application No. 10-2012-0129166, filed on Nov. 15, 2012, Korean Patent Application No. 10-2012-0152644, filed on Dec. 24, 2012 and Korean Patent Application No. 10-2012-0156853, filed on Dec. 28, 2012, the contents of which are all hereby incorporated by reference herein in their entirety.

FIELD OF THE INVENTION

The present invention relates to a human interface configured to receive text information or pointing location information from a user in a digital device, which can receive text or pointing location related information, such as a computer, a notebook (or laptop computer), a tablet PC, a mobile phone, and so on, and to transmit the received information to the digital device.

BACKGROUND ART

A text input device, such as a keyboard, which is configured to input text in a personal computer or portable (or mobile) digital device, has been disclosed. Additionally, a pointing device, such as a mouse device, which is configured to control pointing locations of a pointer and to perform functions of the pointer, which is configured to control the digital device, has also been disclosed.

DETAILED DESCRIPTION OF THE INVENTION

Technical Objects

The related art text input device and pointing device were either provided as separate devices or a pointing input area was configured in a separate area that is differentiated from a text input area of the text input device. Under an operation environment, wherein text input and pointing location information input and pointer execution command input are frequently shifted, due to an excessive number of movements of the hand, operation efficiency is being degraded.

Technical Solutions

By equipping a pointing location information input area of a pointing device at an upper portion of a text input area plane of a text input device, and by equipping a shifting unit configured to shift to and from a text input mode and a pointing location information input mode, among the text input, the performance of a pointing input while minimizing movements of the user's hand by simply shifting the input mode may become possible, and, accordingly, the operation efficiency may be enhanced.

Effects of the Invention

By integrating separately equipped text input device and pointing device with a single human interface device, product price and product size may be reduced, and, by removing unnecessary operation in user manipulation, the operation efficiency may be enhanced.

BRIEF DESCRIPTION OF THE DRAWINGS

FIG. 1 illustrates an exemplary diagram of a multi human interface device being equipped with a pointing device and a text input device.

FIG. 2 illustrates a flow chart describing an exemplary operation order respective to mode switching of a pointing device and a text device.

FIG. 3 illustrates exemplary embodiments of structures of a text input device and a pointing device.

FIG. 4 illustrates exemplary embodiments of a pointer execution command unit integrated mode shifting unit.

FIG. 5 illustrates exemplary embodiments of a structure of a pointer location information input device.

FIG. 6 illustrates a structural diagram of an infrared light-ray laser sensor module.

FIG. 7 illustrates an exemplary embodiment indicating a pointer location information input area.

FIG. 8 illustrates a first exemplary embodiment of a pointer location information input device that can be detached from a text input device.

FIG. 9 illustrates a second exemplary embodiment of a pointer location information input device that can be detached from a text input device.

FIG. 10 illustrates a third exemplary embodiment of a pointer location information input device that can be detached from a text input device.

FIG. 11 illustrates a front view diagram and a perspective view diagram of a human interface device having a low-positioned pointer location information input device applied thereto.

FIG. 12 illustrates an exemplary embodiment of a pointer execution command unit integrated mode shifting unit.

FIG. 13 illustrates an exemplary embodiment of using a cover of a human interface device having a low-positioned pointer location information input device applied thereto.

FIG. 14 illustrates an exemplary embodiment of a human interface device being applied to a mobile electronic device.

FIG. 15 illustrates an exemplary embodiment applying a low-positioned pointer location information input device and a low-positioned pointer execution command unit.

MODE FOR CARRYING OUT THE PRESENT INVENTION

This relates to a multi human interface configured to receive text information or pointing location information from a user in a digital device, which can receive text or pointing location related information, such as a computer, a notebook (or laptop computer), a tablet PC, a mobile phone, and so on, and to transmit the received information to the digital device.

A keyboard, which is configured of an elastic body and a plurality of physical buttons respectively connected to a switched, is being widely used as a conventional text information input device.

Additionally, in a digital device equipped with a touch interface, when a virtual keyboard is displayed on a display, and when part of the user's body touched the virtual keyboard, which is displayed on the display, a method of inputting text through the virtual keyboard, which is displayed on a portion that is touched by the user, by detecting the user's gesture or electrical signal is also being used.

The touch interface may recognize the user's touch by recognizing a movement of a part of the user's body, or by recognizing a contact being made on a specific contact surface, or by detecting a flow of an electric current through the user's body, or by detecting a blockage or interference caused on light or sound wave, and so on, by a part of the user's body.

Examples of a touchscreen interface includes a resistive touchscreen, a capacitive touchscreen, an optical touchscreen, a surface acoustic wave (or ultrasonic) touchscreen, and so on.

The resistive touchscreen corresponds to a touchscreen that is configured to be operated by recognizing pressure.

Although the resistive touchscreen is advantageous in that it is low-priced and that notes can be taken down or small letters can be written by using a stylus pen, the resistive touchscreen is also known to be disadvantageous in that, due to its method of using pressure, touch cannot be recognized when pressed with too much force and also that the resistive touchscreen has a slow touch sensitivity as compared to the capacitive touchscreen.

The resistive touchscreen is configured of a multiple layers.

Among such multiple layers, there is a conductive layer, and the conductive layer consists of two layers facing into each other while having an air layer placed between the two layers.

When an outside of the screen is pressed, the two conductive layers touch one another, and, due to such contact, a change occurs in resistance and electric currents, thereby allowing the touch to be recognized.

A capacitive sensing or capacitive touch method corresponds to a method sensing movements by using a capacitance coupling effect.

Unlike the resistive touchscreen, which uses pressure, the capacitive touchscreen is configured of a highly conductive glass, which is referred to as Indium Tin Oxide.

By having sensors attached to each four corners of the glass, a surface of the glass is in a state of having electric currents flowing therein.

The principle of the capacitive method corresponds to recognizing a change in electric currents by using such glass.

When a finger touches the screen, electrodes flowing through the glass flow into the body through the finger, and, herein, the capacitive method corresponds to an operating method having the sensor detect a location where such change in the electric currents occurs.

Instead of pressing on the screen by applying force, since the capacitive touch method can recognize a touch by slightly touching the screen, the capacitive touchscreen is known to provide smoother manipulation and scrolling.

Additionally, the capacitive touch method can provide a multi-touch function, wherein several points can be touched.

Since the capacitive touch method corresponds to an operating method that uses a changed amount of electric currents, manipulation cannot be performed when wearing leather gloves, through which electric currents cannot flow, or by using fingernails or a stylus pen.

However, the screen may be touched by using a capacitive touchscreen specific separate stylus pen.

Since the sensor is highly sensitive, the capacitive touchscreen may be influenced by other surrounding devices.

The optical touchscreen is operated by measuring coordinates by using an infrared light-ray camera, which is mounted on a vertex of the touchscreen, and a shadow of an object intending to touch the screen, the shadow being created by the infrared light.

The surface acoustic wave (or ultrasonic) touchscreen is operated by measuring coordinates by emitting ultrasonic waves on the screen in order to detect interference effects caused by the user's touch.

Additionally, diverse touch input technologies, which can be used for controlling location information of a pointer by recognizing location information of the user's body part by detecting contact or movement of the user, may be used in the present invention.

FIG. 1 illustrates an exemplary diagram of a multi human interface device being equipped with a pointing device and a text input device.

A pointing device integrated text input device may have a housing (100), which is configured to support a text input device and a pointer location information input area.

The housing is provided with a solidity (or strength) that can resist pressure of a user input, and the housing may be configured of a control unit, a memory unit, a battery unit, an encoding unit, a transmitting unit, and so on, for receiving text input information and pointer location information input information and for transmitting the corresponding information to a digital device, which is connected to the pointing device integrated text input device via wired or wireless connection.

The pointing device integrated text input device may be configured of a plurality of buttons (109) for receiving text input information from the user.

The plurality of buttons (109) may consist of physical buttons or virtual buttons.

The physical button consists of a button that is connected to an elastic body or a button having its own elasticity, and the characteristics of the physical button is that, due to the elasticity of the button, when the button receives a user input, the button makes a position shift, and, when the user input is removed, the button returns to its initial position.

The physical button is configured to be connected to an electrical switch and, the physical button may be configured to have a structure, wherein, when pressure is applied by the user, the button makes a position shift, and a phase of the switch is changed, thereby generating a text input value of the corresponding button.

The physical button corresponds an elastic structure having no electric switch, wherein the elastic structure is configured to perform position shift after receiver a user input and returning to its initial position when the user input is removed (or released), and text input information of the user may generate text input information based upon location information of a location where pressure or gesture of the user is recognized by the above-described touch input device.

The virtual button may be configured by displaying a text input button on the display device.

The virtual button may correspond to an arbitrary button, which is displayed by projecting light on a transparent or semi-transparent or non-transparent object.

The virtual button is not recognized by the user's eyes, yet the virtual button may generate the corresponding text input information based upon the user pressure or gesture information by using the dedicated (or unique) location information for each text.

The multi human interface device may have a text input area (107) and pointing location information input areas (108a, 108b) each having at least a portion as a common area.

The pointing location information input area (108a, 108b) corresponds to an area located at a surface or upper portion or lower portion of the button designated for text input, and, as shown in FIG. 1, the pointing location information input areas may share at least a portion with the text input area.

The pointing location information input area may include the text input area, or the text input area may include the pointing location information input area.

The pointing location information input area and the text input area may have at least a portion in common, and the at least one portion may be used as the pointing location information input area but not used as the text input area, or the at least one portion may be used as the text input area but not used as the pointing location information input area.

The multi human interface device may be configured to have a pointer location information input device (105), which is configured to create a virtual text input area or virtual pointing location information input area for inputting text or for inputting pointing location information or for inputting text and pointing location information, equipped within the multi human interface device or equipped outside of the multi human interface device.

The pointer location information input device (105) may be configured of devices, such as an infrared light-ray generator and an infrared light-ray receiver or an RGB camera or an ultrasonic generator and an ultrasonic receiver or an infrared light-ray generator and an infrared light-ray camera, and the pointer location information input device (105) may receive location information and gesture information by detecting part of the user's body on the housing (100) surface or above the housing (100).

The pointer location information input device may be configured of a plurality of modules by being modulized in order to expand the input area or to enhance accuracy and sensitivity.

For example, a pointer location information input device (105b) for configuring the text input or pointing location information input area (108b) of a right hand may be provided.

Alternatively, a pointer location information input device (105a) for configuring the text input or pointing location information input area (108a) of a left hand may be provided.

The text input area or pointing location information input area (108b), which is designated to the right hand, may include an area of a J button within an English standard keyboard.

The text input area or pointing location information input area (108a), which is designated to the left hand, may include an area of an F button within an English standard keyboard.

In case the right hand and the left hand are not differentiated, the pointer location information input device may include both the area of the J button and the area of the F button within an English standard keyboard.

In case the multi human interface device is connected to a plurality of digital devices each having a display unit, the pointing location information input area may be capable of performing pointer location shift within the plurality of display units.

For example, area division may be performed, so that the pointer location information input area can be matched to each display unit, or a separate button directing the display unit may be manipulated, so as to transmit pointer location information from the corresponding display unit, or pointer location information may be transmitted, so that the pointer can shift its position within a virtual single display unit by recognizing (or identifying) multiple display units as the virtual single display unit.

The multi human interface device includes a pointing location information input device, which configures a pointing input area and receives pointer location information from the user, and the multi human interface device may have a pointer execution command unit (101, 102), which is configured to execute at least one function within a button or image or space or icon or text input window at which a pointer is located, the pointer being moved (or re-located) by the pointing location information input device.

The pointer execution command unit may be configured of one button or two buttons, and each button is respectively in charge of a first function and a second function, and each button may be located on a left portion or a right portion or a center portion of the housing.

The first function, for example, may perform a same function as a left click of a computer mouse, and the second function, for example, may perform a same function as a right click of a computer mouse.

The pointer execution command unit, which is configured of one button or two buttons, may be provided on both the left side and the right side of the housing.

The pointer execution command unit may be configured to be operated by recognizing a touch of a part of the user's body or a blockage of light or an interference of ultrasonic waves or a shadow of the user's body part by using the above-described touch technique.

The pointer execution command unit may be configured of physical buttons having elasticity The pointer execution command unit may be configured to be operated by using at least one button of text buttons, which are located within a text input area apart from the pointing location information input area.

The pointer execution command unit may be operated by selecting a physical or virtual text button within the pointing location information input area.

For example, in case a virtual input device through which location information can be inputted within a space is used as the pointing location information input device, and in case a physical button is used as the text input device, by inputting location information of the pointer within a virtual pointing location information input area in a pointing location information input mode and by pressing (or pushing) a physical button, which is located at the corresponding location, a pointer execution command may be generated.

The pointer execution command unit may receive pointer location information by a first user gesture within the pointing location information input area, and the pointer execution command unit may generate a pointer execution command by a second user gesture from the same location.

The pointer execution command unit may be configured to have the first function executed by using a first gesture of the user's body or a first voice, a first blink (or blink of the eye), a first shape of the mouth (or lips).

The pointer execution command unit may be configured to have the second function executed by using a second gesture of the user's body or a second voice, a second blink (or blink of the eye), a second shape of the mouth (or lips).

The multi human interface device may consist of a text input mode, which can receive text information through the text input device, and a pointing location information input mode, which can receive pointing location information through the pointing location information input device.

The text input mode and the pointing location information input mode may be shifted by a mode shifting unit (103).

The mode shifting unit (103) may be configured of a switch that is separately located on the housing.

The mode shifting unit (103) may execute mode shift by detecting at least one text input button included in the text input device or a simultaneous reception of multiple text inputs.

The mode shifting unit (103) may perform mode shift by receiving control information from a digital device that is connected to the multi human interface device via wired or wireless connection.

The mode shifting unit (103) may be configured to be integrated with the pointer execution command unit (102).

For example, configurations may be made, so that a mode can be shifted by detecting a first touch or a first pressure made by a first gesture, such as a contact of a part of the user's body on a first button, which primarily reacts to a first touch or a first pressure, and which secondarily reacts to a second touch or a second pressure, and so that a pointer execution command can be generated by reacting to the second touch or the second pressure made by a second gesture, such as pressing (or pushing) a button.

The mode shifting unit (103) may consist of a temporary mode shift mode and a permanent mode shift mode.

For example, the temporary shift mode may be configured of shifting the text input mode to the pointing location information input mode by reacting to the first touch or the first pressure, and returning to the text input mode when the first touch or the first pressure is removed (or released).

Alternatively, the temporary shift mode may be configured of shifting the pointing location information input mode to the text input mode by reacting to the first touch or the first pressure, and returning to the pointing location information input mode when the first touch or the first pressure is removed (or released).

The permanent shift mode may be configured of shifting the text input mode to the pointing location information input mode by reacting to the second touch or the second pressure or a toggle switch, and maintaining the pointing location information input mode even if the second touch or the second pressure is removed (or released).

The temporary mode shift may be performed by using first control information, which is received from the digital device being connected to the multi human interface device via wired or wireless connection.

The permanent mode shift may be performed by using second control information, which is received from the digital device being connected to the multi human interface device via wired or wireless connection.

The mode shifting unit (103) may be configured to be integrated with the pointer execution command unit.

For example, when a first touch or a first pressure is detected on the pointer execution command unit, a temporary mode shift from the text input mode to the pointer location information input mode may be set-up, and, when a second touch or a second pressure is detected, a pointer execution command is generated, and when a third touch or a third pressure is applied, a permanent mode shift allowing operation to be maintained in the pointer location information input mode, even if the third touch or the third pressure is removed (or released), may be set up.

At this point, configuration may be made, so that, among the permanent shift modes, a pointer execution command input can be executed.

The mode shift unit may be configured on a left side surface or right side surface of the housing (106*a*, 106*b*)

The mode shift unit (106*a*, 106*b*), which is configured on the left side or the right side or the left side and right side of the housing, may be configured of a virtual button or a physical button, so as to be operated by detecting a touch input or pressure of the user.

The mode shift unit (106*a*, 106*b*), which is configured on the left side or the right side or the left side and the right side of the housing, may be configured to have an input area corresponding to 3 centimeters or more and less than 15 centimeters along the side surface of the housing.

In case a length of the mode shift unit is less than 5 centimeters, it is preferable to set up a location of the mode shift unit to include a left side space of a left Tab key within a Window standard keyboard.

The multi human interface device may have a transmitting unit (104) configured to transmit data via wired or wireless transmission to an external digital device or a digital device including the multi human interface device.

The digital device may receive text input or may receive pointer location information.

FIG. 2 illustrates a flow chart describing an exemplary operation order respective to mode switching of a pointing device and a text device.

The multi human interface device may have a separate power unit or may be supplied with power from an external source via wired or wireless connection.

When power is supplied to the multi human interface device by using a switch, which is configured to control the power unit, it may be determined whether the multi human interface device is currently in the text input mode or in the pointing location information input mode (200).

Based upon the determined result, in case the multi human interface device is in the text input mode, the text input device may be activated, and text input may be received from the user (201).

The text input, which is inputted by the user, may be transmitted to a digital device, which is connected via wired or wireless connection (202).

While operating in the text input mode, when a mode shift occurs to the pointing location information input mode, the text input mode may be shifted to the pointing location information input mode.

Alternatively, configurations may be made, so that pointing location information input is performed at the same time as the text input.

When the mode is shifted to the pointing location information input mode, pointing location information may be received by the user's input (204).

The received pointer location information may be transmitted to the digital device, which is connected via wired or wireless connection (205).

When the multi human interface device receives a pointer first execution command (206), the multi human interface device may transmit the pointer first execution command to the digital device, which is connected via wired or wireless connection (207).

When the multi human interface device receives a pointer second execution command (208), the multi human interface device may transmit the pointer first execution command to the digital device, which is connected via wired or wireless connection (209).

When the temporary mode shift is cancelled, or when the permanent mode shift is cancelled, the multi human interface device may shift to the text input mode.

In case power of the multi human interface device is blocked (or cut off) from a power switch of the power unit or there is no connected digital device or connection has been disconnected, or in case there has been no user input for a predetermined period of time, or termination may be performed by a control of the digital device, which is connected via wired or wireless connection.

FIG. 3 illustrates exemplary embodiments of structures of a text input device and a pointing device.

The multi human interface device may consist of a first housing (301) including a power unit or a control unit or a communication unit, and so on, and a second housing (302) for configuring a text input area and a pointing location information input area.

The multi human interface device may have a text input device and a text input area (303) receiving text input from the user.

At this point, the text input area (303) may be configured of a virtual button or a physical button.

Since a pointing location information input device is configured to have a resistive or capacitive touchpad format, the pointing location information input device may be located on a physical button of the text input device (304).

At this point, in case the text input device is configured to have a physical touchpad format, such as a resistive or capacitive type, the touchpad may be used as the text input device and the pointing location information input device, and the touchpad may be used to have its mode shifted by a mode shift unit.

At this point, the physical touchpad, such as the resistive or capacitive type, may be configured as a large surface touchpad type multi human interface device (300), which is configured of a touchpad (304) including a plurality of text button areas of the text input unit.

Alternatively, the physical touchpad, such as the resistive or capacitive type, may also be configured as a multi-touchpad type multi human interface device (310), which is configured of a multiple touchpads (311) including one text button area of the text input unit.

Alternatively, the pointing location information input may be configured as an upper camera type multi human interface device (320) configuring a pointer location information input area (321) by an infrared camera or RGB camera (222), which is located on an upper portion of the pointing location information input area.

At this point, the upper camera type multi human interface device (320) may configure a virtual text input button (303) by using the upper camera.

A lower camera (332) type multi human interface device (330), which is configured by positioning the camera on a lower portion of the second housing so as to form a pointing location information input area (331), may be configured.

At this point, the lower camera type multi human interface device (330) may configure a virtual text input button (303), which replaces the physical text input button, by using the lower camera.

Alternatively, the camera may be configured as a transmitting/receiving (or transceiving) multi human interface device (340), which receives a pointing location information input through a virtual pointing location information input area (341), wherein infrared light rays or ultrasonic sound waves transmitted by an infrared light ray transmitter or ultrasonic sound wave transmitter are paired with infrared light ray receivers or ultrasonic sound wave receivers receiving information that are blocked or interfered by a part of the user's body.

At this point, a virtual pointing location information input area, which is formed as a pair, may be used as a virtual text button input means instead of the physical text button by using the mode shift unit.

FIG. 4 illustrates exemplary embodiments of a pointer execution command unit integrated mode shifting unit.

In a button type pointer execution command unit including an elastic body (403) configured to change its position due to a user's pressure and to return to its initial potion, when the pressure is released (or removed), a button (402) configured to receive the user's pressure, and switches (404, 405) configured to generate a pointer execution command when touching one another by respectively changing their positions due to the user's pressure, a pointer execution command unit integrated mode shift unit (400) may be configured, wherein a mode shift unit (401) configured to shift a text mode and a pointing location information input mode by detecting a touch input of the user is positioned on an upper portion of the button.

In a button type pointer execution command unit including an elastic body (403) configured to change its position due to a user's pressure and to return to its initial potion, when the pressure is released (or removed), a button (402) configured to receive the user's first pressure, and first switches (404, 405) configured to generate a pointer execution command when touching one another by respectively changing their positions due to the user's pressure, a pressure differentiating pointer execution command unit integrated mode shift unit (410) may be configured, wherein the pressure differentiating pointer execution command unit integrated mode shift unit is configured of a second switch unit (411, 412) configured to generate a mode shift execution command when touching one another due to the user's second pressure, which is smaller than the user's first pressure.

In the pressure differentiating pointer execution command unit integrated mode shift unit (410), by changing the position of the button (402), the button (402) may be fixed so that it cannot return to its initial position due to the elastic body (403).

At this point, when the button is fixed by setting the fixed position of the button to a position that touches the second switch (411, 412) and that does not touch the first switch (404, 405), configuration may be set to operate the device in a permanent mode shift mode.

In the pointer execution command unit integrated mode shift unit (400) using touch input, configuration may be made, so that a permanent mode shift switch (414) can be operated by a position change, which is performed by sliding the button unit, and so on, and when additional pressure is applied, while the permanent mode shift switch (414) is in an activated state, the pointer execution command switch (404, 405) may be configured to be operated.

The pointer execution command unit integrated mode shift unit (410) is configured of a touch pad (421), so as to operated as a mode shift unit, when a contacting surface of the user's body part touching the touch pad is within a first predetermined range, and to be operated as a pointer execution command mode, when the contacting surface is within a second predetermined range.

FIG. 5 illustrates exemplary embodiments of a structure of a pointer location information input device.

The pointer location information input device of the human interface device may include a sensor module (501) including a light emitter and a camera.

The light eminner of the sensor module (501) performs a function of configuring a light plane, so that a light path can be blocked or reflected by an obstacle, e.g., the user's finger, placed on a pointing location information input area (108), which is configured on the light plane consisting of light emitted from the light emitter.

The camera of the sensor module includes an optical sensor configured to detect light that is blocked or reflected by the obstacle.

The optical sensor may use a line camera, which can recognize line images.

It will be adequate for the line camera to have an image sensor configured of 400 to 1000 elements in a line format, and, preferably, it will be ideal for the line camera to be configured of 500 to 700 elements.

The line camera may include a plurality of line image sensors, which are configured to be one fifth to one seventh smaller than the 500 to 700 elements.

The light emitter is configured as a light emitting device for configuring a light plane, wherein the light emitter is placed above a text input button (303) so as to be spaced apart at approximately 1 millimeter.

The pointing location information input area (108) is configured as a portion of the light plane.

For example, an infrared light ray emitter, an infrared laser emitter, a laser emitter, an infrared light ray emitter, visible light emitter, and so on, may be used as the light emitting device.

It will be ideal to use an infrared laser emitter, which does not require a reflecting plate to be installed on edge portions, as the light emitting device.

It will be adequate for the infrared laser emitter to operate laser having a laser wave of 800 to 850 nanometers at 0.3 to 1 milliWatt.

The light emitter allows the light of the infrared emitter to pass through a line lens, so that the light can be dispersed while forming a plane.

A line lens may be further included in a light emitting unit of the light emitter, so that the light emitted from the light emitting device can configure a light plane.

The line lens is positioned to allow the light emitted from the light emitting device to configure a light plane that is substantially parallel to the text input unit.

The pointer location information input device may further configure an optical filter (504), so that only the light of a specific wave range within the light of the light emitter can pass through.

The optical filter (504) is installed so that light being emitted from the light emitter can pass through, and, additionally, when light being reflected or blocked by an obstacle is received by a camera, the optical filter (504) may also be installed in front of the camera in order to prevent light that has not been emitted from the light emitter from being received.

Although the light emitter and the optical filter for the camera are separately configured, it is preferable to closely install the light emitter and the camera, so that light being transmitted and light being received by one optical filter can both be filtered.

The optical filter may be designed to be perpendicular to a travelling direction of the light of the light emitter.

Based upon an aspect of design, the optical filter may be installed at 30 degrees to 60 degrees or 120 degrees or 150 degrees with respect to the travelling direction of the light emitter.

The sensor module (501) may be installed to allow the light of the light emitter to be directly emitted as a light plane. (510)

The sensor module (501) may further include one reflecting plate (503), so that the light of the light emitter can be emitted as a light plane after being refracted once. (520)

At this point, the light that is reflected or blocked by the obstacle may also be received by the camera after being refracted once by the reflecting plate (503).

The sensor module (501) may include two reflecting plates (503a, 503b), so that the light of the light emitter can be emitted as a light plane after being refracted twice. (530)

At this point, the light that is reflected or blocked by the obstacle may also be received by the camera after being refracted twice by the two reflecting plates (503a, 503b).

Accordingly, a sensor module may be installed inside a first housing (301).

At this point, by coating an optical filter on the reflecting plate (503), a separate optical filter (504) may be replaced.

When the pointing location information input area (108) is activated by the sensor module (501), by using his (or her) finger, the user inputs pointing location information, moving his (or her) finger in a sweeping motion sweeping over multiple text input buttons (303).

At this point, in order to prevent the movement of the user's finger from being disturbed due to the distance between each text input button (303), it will be ideal to set the distance between each text input button (303) to range from 0.1 millimeter to 1 millimeter.

Additionally, it is preferable for the text input button (303), which is located on a lower portion of the pointing location information input area (108), to have upper surfaces of the multiple text input buttons to be located on a flat plane.

A light source, which corresponds to a light source emitted from the sensor module (501) that is reflected by a reflecting plate or an obstacle and received back to the camera, passes through a light tunnel (502).

At this point, when an upper surface of the light tunnel is replaced by a portion of the first housing (301), the thickness of the housing may be reduced.

A lower surface and side surfaces of the light tunnel may be designed as an architecture that is separate from the first housing.

FIG. 6 illustrates a structural diagram of an infrared light-ray laser sensor module.

A principle of an infrared sensor module is to basically emit light covering the pointing location information area by using a light source (601) and to analyze the light being reflected or blocked by an obstacle and calculate a location of the obstacle by using one camera or two cameras (603).

At this point, in order to allow the light being emitted from the light source (601) to be scattered, so that the light can be emitted to a wanted area, a line lens (602) may be used.

It is preferable to use a line camera as a camera for recognizing a state of the light source being reflected or blocked by an obstacle.

The camera may install a guide light tunnel in front of the camera, wherein the guide light tunnel can help the light that is being received to receive light of a wanted area.

The light source may correspond to infrared light rays, ultra-violet light rays, laser, and so on.

The light source and the camera may be respectively replaced with ultrasonic sound waves and an ultrasonic sound wave receiver.

In order to avoid installing a reflecting plate on the edge of the keyboard, it is preferable to use an infrared light ray laser as the light source.

In case infrared light is to be used, a reflecting plate may be installed on the edge of the keyboard, or the output of the light source may be increased to two times or more as compared to an optical touch module for general screens, or a supplemental light source may be additionally installed.

The sensor module may have a supplemental control board (604), which is configured to control the light source and the camera and to deliver a received signal of the camera to a main control board.

The pointer location information input unit may be positioned to include a portion of an extended surface of the text input unit plane.

The text input unit includes a plurality of buttons receiving at least one text, and the button generates a text select signal by shifting from a first position to a second position due to a pressure applied the user, and the button may be configured as a physical button format, which returns to its initial position due to its elastic body.

The text input unit includes F4 and F5 buttons within a Windows standard keyboard, and two cameras are included as the camera of the pointer location information input unit, and the text input unit may be designed, so that, among the buttons of the text input unit, the F4 or F5 button can be configured as the button located in a position nearest to the camera located on the left side, among the two cameras.

Alternatively, the camera located on the left side may be located on an area, to which a distance between the F4 button and the F5 button below a spacebar of the Windows standard keyboard has performed a downward parallel shift.

Accordingly, in case a position of an index finger of the right hand is placed on an F position, among the text input buttons, an effect of an index finger of the left hand blocking the camera, when pointer location information is inputted by using the right hand, may be reduced.

Among the text input unit, when a button having the largest surface area, e.g., the space bar, is configured as the pointer execution command unit, for example, which mouse location information is inputted by using the right hand, the pointer execution command unit can be easily executed by using the left hand.

At this point, since the left hand may already be executing the mode shift unit, it is preferable to set up a minimum distance between the mode shift unit and the pointer execution command unit to 8 to 15 centimeters.

The mode shift unit may be provided separately from the button of the text input unit, and the mode shift unit may be shifted to and from the text input mode and the pointer location information input mode by recognizing that a part of the user's body has touched a portion of the human interface body, and, herein, the device may be operated in the pointer location information input mode when touched, and the device may be operated in the text input mode when untouched (or not touched).

The pointer execution command unit is configured of two buttons, and, when a first button is pressed, a first function, e.g., a left click of the mouse, is executed, and when a second button is pressed, a second function, e.g., a right click of the mouse, is executed, and, herein, among the text input buttons, the first button corresponds to a button having the largest surface area, e.g., the spacebar, and, when the second button is set up as a first button located on a left side or right side of the first button, the pointer execution command unit may be conveniently controlled by a thumb of the right hand, thereby providing an easy and convenient user experience.

When the mode has been shifted to the text input mode or the pointer location information input mode by the mode shift unit, an indication indicating the text input mode or the pointer location information input mode may be displayed.

The display of the pointer location information input mode may be temporarily indicated at an instant when a touch occurs on the mode shift unit, or the pointer location information input area may be indicated starting from an instant when a touch occurs on the mode shift unit to an instant when the touch is released, and, herein, the indication may be displayed as a sound or text or lighting signal.

By doing so, it will be advantageous in that the user is capable of recognizing the current mode status of the keyboard, and that, in case of the pointer location information input mode, the user may be capable of easily knowing at which location the pointer location information is to be inputted.

The text input area of the text input unit may be designed to be identical to the pointer location information input area of the pointer location information input unit, or the text input area of the text input unit may be designed to include the pointer location information input area of the pointer location information input unit, as shown in FIG. 1.

As an exemplary embodiment for configuring the pointer location information input unit, the pointer location information input unit may include one or two optical emitters and cameras.

An optical signal being received by the camera may be designed to pass through a light tunnel, so as to block out external noise light source.

The light tunnel may be configured before the optical signal is emitted from the optical emitter to the pointer location information input area, and the light tunnel may be installed on a front surface of the camera, which receives an input signal of the user from the pointer location information input area.

At this point, a reflecting plate, which is configured to refract the optical signal being emitted from the optical emitter or the optical signal being received by the camera, may be positioned.

By assigning a level of freedom in the installation position and direction of the pointer location information input unit through the reflecting plate, an efficient usage of space in the architecture and advantages in the design may be gained.

The pointer location information input unit may be configured to have the pointer location information input area located at a position at least 0.1 to 5 millimeter above the text input unit, due to the optical emitter and the camera.

Accordingly, pointer location information may be received only when a distinctive (or accurate) touch of the user is intended.

If an infrared light ray laser having a wave ranging from 800 to 850 nanometers and operating at 0.3 to 1 milliWatt is used in the optical emitter, excellent power consumption and cost, stability, safety, and appearance may be gained.

The optical emitter may further include a line lens, which scatters the optical signal, so that the optical signal can configure a pointer location information area that is parallel to the text input unit.

The pointer location information input unit may be devised to block optical external noise by using an optical filter, which only allows the optical signal of an infrared light ray area to pass through.

When designed to have the distance between the physical buttons range from 0.1 to 1 millimeter, the text input unit may allow the user to be sufficiently provided with a soft and flat touch sensation, while inputting the pointer location information.

FIG. 7 illustrates an exemplary embodiment indicating a pointer location information input area.

The human interface device may be designed to further include pointer location information input display units (701, 702), which visually display (or indicate) the pointer location information input area when in the pointer location information input mode.

The mode shift unit may be provided separately from the button of the text input unit, and the mode shift unit may be designed to shift to and from the text input mode and the pointer location information input mode by recognizing that a part of the user's body has touched a portion of a housing of the multi human interface, and, herein, the device may be designed to be operated in the pointer location information input mode when touched, and to be operated in the text input mode when untouched (or not touched).

At this point, in case the part of the user's body being used for performing the mode shift corresponds to the right hand (106b) the mode shift unit may be designed to have the left hand perform the pointer location information input (108a).

In this case, it is preferable to design the pointer location information input area to be located closer to a corner facing into the corner where the mode shift unit is located, and the design may be made under the same principle when the left hand and the right hand are used in an opposite manner. (106a, 108b)

Conversely, the mode shift unit may also be designed to have the right hand correspond to the part of the user's body being used for performing the mode shift and to have the right hand also corresponds to the hand performing the pointer location information input.

In this case, it is preferable to design the pointer location information input area to be located closer to the corner where the mode shift unit is located instead of the corner facing into the corresponding corner, and the design may also be made under the same principle in case of the left hand.

The mode shift unit may determine the text input mode and the pointer location information input mode based upon a number or location of the user's fingers recognized by the pointer location information input unit.

The number of the user's fingers recognized when the input mode is determined as the pointer location information input mode is smaller than the number of the user's fingers recognized when the input mode is determined as the text input mode.

For example, while the mode shift unit is controlled by using the left hand, the finger of the left hand may be in an untouched state from the text input button, and the index finger of the right hand may be in a touched state in order to perform pointer location information input, and, in this case, the number of fingers of the user that are recognized is equal to one.

Conversely, when the fingers of the left hand and the right hand are touching the keyboard in order to perform text input, the number of recognized fingers of the user may be recognized as 2 to 8 or less.

The pointer location information input mode display unit may be temporarily displayed (or indicated), when the input mode shifted to the pointer location information input mode by the mode shift unit, or the pointer location information input area may be visually displayed (or indicated) starting from a time point when the input mode has been shifted to the pointer location information input mode to a time point when the corresponding mode is released (or cancelled).

The pointer location information input mode display unit may be designed to be displayed from the text input button due to a visible light ray generator or a reflected light caused by the text input button or through a distance between the text input buttons.

At this point, the input mode may also be displayed in case the input mode is in the text input mode, and the indication may be displayed to differentiate the text input mode and the pointer location information input mode from one another.

The pointer location information input mode display unit is configured of surfaces (702a, 702b) deposited with a dye (or colorant), which emits visible light rays by optically reacting to non-visible light ray generators (701a, 701b) or non-visible light rays, and the dye may be deposited on the text input buttons or on intervals (or spaces) between the text input buttons.

The mode shift unit may further include a hand-side determination unit, which is configured to determine whether the user performed the pointer location information input with his (or her) left hand or right hand.

The display of the pointer location information input mode display unit may be changed in accordance with the hand-side determination unit.

Button alignment and operation of the pointer execution command unit may be fluidly shifted in accordance with the hand-side determination unit.

For example, in case the pointer execution command unit includes a mouse right click and left click, the buttons that are to respectively perform the mouse right click and left click may be shifted in accordance with the determination of the hand-side determination unit.

The pointer location information input mode display unit may indicate (or display) different pointer location information input areas (702a, 702b) in accordance with the determined result of the hand-side determination unit.

When operating in the pointer location information input mode, when a pointer location information input is not inputted by the user for a predetermined period of time, or when an input is received through a text input button, the mode shift unit may be designed to be automatically shifted to the text input mode.

The pointer location information input mode display unit may be designed to recognize a pointer input area, even during the text input mode, by depositing the text input buttons or portions of the text input buttons with a dye (or colorant), so as to be visually indicated (or displayed) regardless of the mode of the mode shift unit.

FIG. 8 illustrates a first exemplary embodiment of a pointer location information input device that can be detached from a text input device.

Being designed to be detached from a text input device (800), a pointer location information input device (810) may be attached (801) or detached from (802) the text input device.

At this point, a power connection unit (820) included in the pointer location information input device may be supplied with power from a power source of the text input device (800).

The pointer location information input device (801) includes at least one pointer location information input device (105a, 105b) and may further include a control unit and an optical filter (504).

The detachable pointer location information input device (810) may be attached, so as to configure a pointing location information input area on surface that is parallel to the text input area (801), and, by being positioned on a left side (803) or a right side (804) of the text input device, a pointing location information input area may be configured on a bottom surface where the text input device is placed.

At this point, the pointing location information input device and the power connection unit (820) are designed to be fluidly modified in accordance with a location shift (or change) of the pointing location information input device.

FIG. 9 illustrates a second exemplary embodiment of a pointer location information input device that can be detached from a text input device.

The pointer location information input device (900) includes an internal power unit, so as to be supplied with power from an external or embedded battery.

When the pointer location information input device (900) is operated in a first location information input mode (902), a housing of the pointer location information input device (900) may be designed to have a constant height and angle, so that a pointer location information input area can be parallel to a text input area of the text input device.

Alternatively, a first location information input mode adjustment device, which can adjust the height and inclination of the housing, may be further included, so as to allow the user to arbitrarily adjust the height and angle of the location information input area.

When the pointer location information input device (900) is operated in a second location information input mode (904), a housing of the pointer location information input device (900) may be designed to have a constant height and angle, so that a pointer location information input area can be parallel to a bottom surface where the pointer location information input device (900) is placed.

Preferably, at this point, the height of an optical filter (504) in the first location information input mode is higher that the height of the optical filter (504) in the second location information input mode.

When the pointer location information input device (900) is operated in a third location information input mode (906), a housing of the pointer location information input device (900) may be designed to have a constant height and angle, so that a pointer location information input area can be formed to include an area that is perpendicular to a bottom surface where the pointer location information input device (900) is placed.

In order to be capable of identifying two modes among the first location information input mode, the second location information input mode, and the third location information input mode, depending upon the state in which it is placed on the bottom surface, the pointer location information input device (900) may include a location information input mode sensor unit.

The location information input mode sensor unit may be configured of a sensor using gravity, a sensor detecting a surface placed on the bottom, or a switch.

The pointer location information input device (900) may have any one mode of the first to third location information input modes.

Most particularly, in case of the third location information input mode (906), the mode shift for the shifting the text input mode and the pointer location information may be replaced with whether or not the user's hand or finger has been detected in the location information input device (900).

More specifically, while the user is performing text input, in the location information input device being in the third location information input mode, the user's hand or finger is not detected.

When the user places his (or her) hand or finger on an upper portion of the location information input device, which is in the third location information input mode (906), in order to input the location information of the pointer, the location information input device (900) is shifted to the pointer location information input mode.

Alternatively, a digital device, which is connected to the text input unit (800) and the location information input device (900) via wired or wireless connection, may shift to and from the text input mode and the pointer location information input mode based upon a state when the location information input device has detected the user's hand or finger.

Alternatively, the location information input device (900) may transmit information, so as to allow the text input unit (800), which is connected via wired or wireless connection, to perform mode shift by receiving status information of the location information input device (900), or to allow the digital device to perform mode shift.

At this point, in case the text input is being performed, the location information input device (900) may be shifted to a first power saving mode, which consumes less power than when operated in the pointer location information input mode.

Once the text input is stopped, during an initial first interval, the first power saving mode may be shifted to an active mode.

Once the text input is stopped, if the user's hand or finger is not detected during an initial first interval, the mode may be shifted to a second power saving mode, which consumes less power than the first power saving mode.

In the first power saving mode, in order to determine the presence or absence of the user's hand or finger, a sensor may be periodically controlled by using less power than the active mode.

In the first power saving mode, when the user's hand or finger is detected, the mode may be shifted to the active mode.

In the active mode, the mode may be shifted to the pointer location information input mode.

In the pointer location information input mode, a pointer execution command unit for pointer execution commands may generate a pointer execution command, by using a button provided on the text input device, or based upon a change (or shift) in a position or shape of the detected user's hand or finger.

The location information input device (900) may be activated by the mode shift unit of the text input device (800).

FIG. 10 illustrates a third exemplary embodiment of a pointer location information input device that can be detached from a text input device.

The location information input device (1000) may have a housing (1001) enveloping at least two surfaces of a text input device so that the text input device (800) can be mounted.

The location information input device (1000) is configured of a pointer location information input device (105a, 105b) and a mode shift unit (106), a control unit (1001) and a housing (1002), an optical filter (907) (1010).

The text input device (800) is mounted to the pointer location information input device (1000) (1020), and, then, the optical filter is located at a portion higher than the text input device (800), so that a light source for configuring a pointing location information input area, which is parallel to an upper portion of the text input device (800) input area, can pass through the optical filter (907).

At least one surface (1003) of the housing (1002) enveloping the text input device may have its surface material respectively processed as a mirror, transparent glass or plastic, or a light absorber of a black color group in accordance with the different types of pointer location information input devices, so that the light source emitted from the pointer location information input device (105) can be reflected or penetrated (or passed through) or absorbed.

FIG. 8 and FIG. 9 and FIG. 10 correspond to exemplary embodiments of a pointing location information input device that can be detached from the text input device and have the following components.

The pointer location information input device includes a pointer location information input unit, which receives information related to pointer location from the user.

The pointer location information input device receives pointing location information of the user, which is inputted through a pointing location information input area, which is configured by the pointer location information input device.

The pointer location information input device includes a pointer execution command receiving unit, which receives a signal of a pointer execution command unit, which receives a user's command, so that at least one function can be executed at a position where the pointer is located.

The pointer execution command unit may be configured of a button or a touch switch, which is included in the pointer location information input unit, or the pointer execution command unit may be configured of a control unit, which shifts to a pointer execution command, when a predefined input is received, among the user inputs received from the text input device.

The pointer location information input device includes a mode shift command receiving unit, which receives a signal of the mode shift unit that shifts to the pointer location information input mode.

The mode shift unit may be configured in the pointing location information input device or may be configured in the text input device or may be configured as a separate device.

The pointer location information input device includes a power unit delivering power to the pointer location information input unit and the pointer execution command receiving unit and the mode shift command receiving unit.

The power unit may correspond to a power unit having an embedded battery or may correspond to a contactor being supplied with power from an external source.

The pointer location information input device includes a pointer location information transmitting unit configured to transmit information related to the pointer location, which is inputted to the pointer location information input unit, to a digital device, which is connected to the human interface device via wired or wireless connection.

The pointer location information input area of the pointer location information input unit is set to have a pre-decided height and angle, so that the pointer location information input area can be positioned to be parallel to an upper surface of at least a portion of the text input area of the text input device, which is configured of multiple physical buttons.

In case the mode shift unit is provided separately from the text input buttons of the text input device, the mode shift unit may be fixed to at least one surface of the text input device, by recognizing the reception of a user input, the mode shift unit may transmit information indicating that the mode corresponds to the pointer location information input mode to the mode shift command receiving unit via wired or wireless connection.

The pointer location information input unit may include an optical emitter and a camera, and an optical signal being received by the camera may be designed to pass through an optical filter after passing through a light tunnel.

The pointer location information input device includes a location status recognizing unit configured to recognize location status information respective to gravitational information of the human interface device or location status information respective to a bottom where the human interface device is placed or location status information of the human interface device through an input of the user.

The location status may be configured of at least two types, and, in case of a first location status, the mode is shifted to a first pointer location information input mode, and, in case of a second location status, the mode is shifted to a second pointer location information input mode The pointer location information input area respective to the first location status indicates that the pointer location information input area is positioned to be parallel to at least a portion of the text input area of the text input device.

The pointer location information input area respective to the second location status indicates that the pointer location information input area is positioned to be parallel to a bottom surface where the pointing location information input device is placed.

By locating an upper surface of the pointing location information input device operating in the first pointer location information input mode on the bottom surface, when shifting to the second pointer location information input mode, an ordinate of the pointing location information input is calculated identically, whereas an abscissa of the pointing location information input is calculated by alternating (or switching) increasing and decreasing directions.

Among the text input buttons of the text input device, the spacebar may be used as the pointer execution command unit, and another button that is adjacent to the spacebar may be additionally used as the pointer execution command unit.

The power unit may be supplied with power from the text input device.

The pre-defined height and angle of the location information input area respective to the first location status may be defined by an adjuster, which allows the user to perform adjustment within a pre-defined range.

The adjuster may have its angle adjusted by adjusting a connection angle with a surface that is adjacent to at least one surface of the housing of the pointing location information input device.

The adjuster may have its height adjusted by adjusting the height of at least one surface of the housing of the pointing location information input device.

The adjuster may have its pre-defined angle and height adjusted by adjusting the angle and height of an optical module of the pointing location information input unit of the pointing location information input device.

FIG. 11 illustrates a front view diagram of a human interface device having a low-positioned pointer location information input device applied thereto.

The human interface device includes a text input unit comprising a plurality of physical buttons, a pointer location information input unit configured to receive information related to a pointer location from a user, a pointer execution command receiving unit configured to receive a signal of a pointer execution command unit receiving a command of the user to perform at least one function at the pointer location, a mode shift command receiving unit configured to receive a signal of the mode shift unit shifting to a pointer location information input mode, a power unit configured to deliver power to the pointer location information input unit and the pointer execution command receiving unit and the mode shift command receiving unit, a pointer location information transmitting unit configured to transmit the information related to the pointer location, which is inputted to the pointer location information input unit, to a digital device being connected to the human interface device via wired or wireless connection. A pointer location information input area of the pointer location information input unit is located to be parallel (321) to an upper surface of at least a portion of a text input area of the text input unit, which comprises a plurality of physical buttons, and wherein the pointer location information input unit is configured of at least two sensor modules, and wherein the at least two sensor modules are respectively located on a lower left side (1102) and right side (1103) of the human interface device.

The pointer location information input unit comprises an optical emitter and a camera, and an optical signal that is received by the camera passes through a light tunnel.

The mode shift unit is provided separately from text input buttons of the text input device.

The mode shift unit is located on a left side of a text input area of the text input device, and, by recognizing the reception of a user input to the mode shift unit, the mode shift unit transmits information indicating that the mode corresponds to the pointer location information input mode to the mode shift command receiving unit.

The physical button is configured of an upper portion of the button, which receives a pressure from the user's finger, and an elastic body, which applies a physical force so that the upper portion of the button can return to its initial position when the pressure of the user's finger is removed.

The multi human interface device is provided with a reflector reflecting or an absorber (1101) absorbing a light source being generated from the pointer location information input unit on a left side, a right side, and an upper portion of the text input area and is not provided with at least one portion on a lower portion of the text input area.

The reflector is used when the light source being generated from the pointer location information input unit corresponds to infrared light rays, and the absorber is used when the light source corresponds to infrared light ray laser.

At least two sensor modules (1102, 1103) of the pointer location information input unit are positioned so that at least a portion of each sensor module is included in lower portions of an outer left side area and an outer right side area of the text input area. More specifically, a left side sensor is positioned at a location below the control button including at least a portion of a left side of a control button of a standard Windows keyboard, i.e., at a location further below toward a housing corner where there are no control buttons. Accordingly, in order to maximize the attractive appearance of the multi human interface, the sensor module allows the multi human interface device to be configured at a minimum volume.

Additionally, by locating the position of the sensor near a vertex of the text input area (1110), having the sensor face a diagonal direction of the text input device may allow the pointer location information input area to be configured to have a larger surface area, as compared to when the sensor is positioned on corner areas so as to face horizontal and vertical directions of the text input area. Furthermore, by shifting the location of a portion having a relatively low location information detection accuracy of the pointer location information between a sensor and another sensor, the overall pointer location information input area at an upper portion of the text input area may be maximized.

Additionally, the location of the sensor may be located on a lower end of the spacebar in the standard keyboard, so as to have a smaller width than the width of a keyboard (1120). The width between a sensor and another sensor decides a width of the pointer location information input area, and, accordingly, although the surface area of the pointer location information input area is decreased as compared to when the sensor is located on the corner (1110), a relatively higher pointer location information detects resolution may be gained.

A distance between a sensor and another sensor eliminates the reflector or absorber of the light source, and, by reducing the height of the housing, when pressing on the spacebar of the standard keyboard by using the thumb, the thumb may be prevented from being stalled by the housing.

FIG. 12 illustrates an exemplary embodiment of a pointer execution command unit integrated mode shifting unit.

When an input operation leading to frequent shifting to and from the text input mode and the pointer location information input mode is performed, a number of sessions inputting mode shift and pointer execution commands increases.

For example, in case of a right-handed user, when the user wishes to input pointer location information while performing text input in the text input mode, the user is required to perform mode shift by using his (or her) left and or right hand and, then, after inputting the pointer location information, the user is required to perform input to the pointer real name command unit by using his (or her) left hand.

Generally, while performing swift operation, the user tends to input text and pointer location information and pointer execution information while locking his (or her) eyes (or eye-view) on the monitor, and, herein, in case the mode shift unit and the pointer execution command input unit are separately provided, this may cause the movement of the hand to occur too frequently, and by failing to correctly locate the accurate location of the unit, the user may not be able to properly execute the intended function or may experience inconvenience in the working process of having to directly look at the keyboard.

In order to resolve this problem, for example, in case of a right-handed user, after performing text input in the text input mode, when the user places his (or her) left hand on the mode shift unit, a mode shift command is generated, thereby shifting the mode to the pointer input mode. Then, while the hand is placed on the mode shift unit, after inputting pointer location information by using the right hand, when pressure is applied on the mode shift unit, the pointer execution command unit may be capable of receiving the input of the user.

Accordingly, the user may share a location of the mode shift unit for performing mode shift and a location of the pointer execution command unit for performing pointer execution command.

As an exemplary embodiment for realizing the same, the mode shift unit is configured of a touch switch that can receive a touch input of the user's hand and the pointer execution command unit is configured of a switch that reacts to pressure, such as a tact switch, and is located below the mode shift unit.

At this point, a first pointer execution command unit (1104) and a second pointer execution command unit (1105) are configured to be connected to one another through a conductive material, which can recognize a touch from the user's hand, or a first pointer execution command unit (1104) and a second pointer execution command unit (1105) are configured to be commonly connected to one another through the mode shift unit (1201), so that mode shift can be equally realized whether the user touches the first pointer execution command unit or whether the user touches the second pointer execution command unit.

At this point, the mode shift activates the pointer location information input mode, while the touch is being applied, and the mode shift is operated in the text input mode, when the touch is released.

In addition to touch, the mode shift performed by touch may be configured of another switch that is operated by a pressure lower than the pressure applied for the pointer execution command or may be configured of a sensor that can sense the location of the user's finger.

At this point, the mode shift and pointer execution command unit may be located in an area that is differentiated from the text input area.

Preferably, in case of a right-handed user, the mode shift and pointer execution command unit is located on an outer left side area of the text input area.

In case the mode shift and pointer execution command unit is located outside of the text input area, the possibility of the pointer location information input unit confusing the respective input with the pointer location information input may be eliminated, and the pointer location information input area may be extended.

The multi human interface device may be provided with a second mode shift unit (1202). As a switch operating as a toggle switch, each time an input is received from the user, the second mode shift unit shifts to and from the text input mode and the pointer location information input mode. Accordingly, even though the user is not touching the mode shift unit with his (or her) left hand, the user may be capable of performing pointer location information input by only using his (or her) right hand.

At this point, in case the multi human interface device is in the text mode due to the second mode shift unit, and in case a mode shift command generated by touch is received, the multi human interface device operates in the pointer location information input mode. Additionally, in case the multi human interface device is in the pointer location information input mode due to the second mode shift unit, and in case a mode shift command generated by touch is received, when the mode shift command generated by touch is cancelled while the pointer location information input mode is maintained, or when text input is received by the text input unit, the mode is shifted to the text input mode.

At this point, when a mode shift is performed by a text input, at least a first text input is disregarded, and when at least two or more text inputs are received, the mode may be shifted to the text input mode.

At this point, when at least two or more text inputs are received, and the mode is shifted to the text input mode, the multi human interface device transmits a text input including the disregarded at least first text to the digital device, and, then, the multi human interface device transmits newly inputted text input information to the digital device.

FIG. 13 illustrates an exemplary embodiment of using a cover of a multi human interface device.

In order to allow the pointer location information input device to form a pointer location information input area, the multi human interface device requires a space of at least 1 millimeter to 2 millimeters on an upper portion of a flat surface (or plane) of the text input device, which is configured of a physical device, and an edge for locating an absorber for absorbing or a reflector for reflecting an optical signal may be required to envelop the text input area and may be required to be formed on at least 3 corners.

At this point, a difference of at least 1 to 2 millimeters may occur between a height of the edges of the at least 3 corners and a height of flat surface (or plane) of the text input area, and a cubic (or cube-like) space is substantially formed on an upper portion of the text input area.

The multi human interface device may be further equipped with a multi-purpose cover (1322), which is configured to protect (or guard) the text input area from external shock, on the substantial cubic-type space (1310).

The multi-purpose cover (1322) may be detached from the multi human interface device (1320) and may be attached or detached due to a magnet or a physical structure.

The multi-purpose cover (1322) may be configured to have a structure that can be folded multiple times. Preferably, as a structure that can be folded twice, a width of at least one section of the divided sections may be smaller than a width of the other section.

This allows an inclination of the multi human interface device to be further reduced, when the multi-purpose cover is mounted on a lower portion after being folded, in order to adjust the inclination of the multi human interface device.

After being folded, when the multi-purpose cover is mounted on the bottom surface of the multi human interface device, among the folded surface, a portion that comes in contact with (or touches) the ground surface may be provided with an inclined surface (1342), so that the surface touching the ground surface can become larger.

A wanted inclination of the multi human interface device may be adjusted in accordance with a number of folding of the multi-purpose cover (1322).

The multi-purpose cover (1322) may be internally equipped with a rechargeable battery (1323) inside the cover.

An electrode of the rechargeable battery (1323) may be located on a lower portion of the multi-purpose cover, and the electrode may be located on a portion of an area that is protruded more than a portion covering the text input area (1331), and, in case the multi-purpose cover is covering the text input device (1310), the electrode may be connected to an electrode that is provided on an upper portion of the multi human interface device.

Additionally, in case the multi-purpose cover is folded, and in case the multi-purpose cover mounted on a lower portion in order to adjust the inclination of the multi human interface device, the electrode of the battery may be connected provided on an electrode provided on a bottom surface of the multi human interface device.

Being connected to an external power, the multi human interface device may supply power to the rechargeable battery (1323) embedded in the multi-purpose cover or may separately recharge the multi-purpose cover.

At this point, a bottom surface of the multi human interface device is equipped with a covering area (1332) covering a text input area, which has a height that is different from the protruded edge area where the electrode (1331) is located, and a groove where a magnet or a physical joining device or a cover is inserted, so that detachment or attachment can be performed at an accurate location.

The edge of the multi-purpose cover is deposited with a material that can remove (or eliminate) fine dust particles or grease, moisture, and so on, and, each time the cover is attached to or detached from the multi human interface device, foreign substances on the absorbing plate or reflecting plate or the front surface of the optical emitter and the camera may be removed (or eliminated).

In case the multi-purpose cover is covering the text input area, when this is detected, the power of the multi human interface device may be turned off.

In case the multi-purpose cover is mounted on a bottom surface of the multi human interface device, the power of the multi human interface device may be turned on.

Additionally, after the power is turned on, if there is no user input for a predetermined period of time, the power may be blocked or the device may be shifted to a stand-by mode.

In case the multi-purpose cover is covering the text input area (1310), the multi human interface device is substantially configured to have a cubic form consisting of a thin plate, and may maximize its attractive appearance by being designed to have no inclination when placed on the ground surface and to have a smaller inclination when a multi-purpose cover is mounted on the lower portion.

Meanwhile, when the multi-purpose cover is folded and mounted on a bottom surface of the multi human interface device, an inclination may be provided just as a general keyboard.

Although the multi-purpose cover is detachable, the multi-purpose cover may be designed to be folded by making downward circular movements from the upper surface to the bottom surface of the multi human interface device due to a hinge.

FIG. 14 illustrates an exemplary embodiment of a human interface device being applied to a mobile electronic device, such as a mobile electronic device or a tablet personal computer.

The multi human interface device (1420) may be used as an input device of a mobile electronic device.

A mobile electronic device including a multi human interface device may be designed to have a structure, wherein a display unit being configured of a display panel (1411) and a frame (1410) supporting the display panel is joined with the multi human interface device by a hinge (1427) so as to be covered and opened.

At this point, the display unit is configured to be inserted in a substantially cubic space, which is configured of a text input area and a reflecting plate or absorbing plate (1424) of the human interface device. Thus, a thickness of the mobile electronic device using the human interface device may be minimized.

In order to do so, a display unit of the mobile electronic device should be designed to have a width that is smaller than the width of the human interface device (1420) as much as at least two times the width of the reflecting plate or absorbing plate (1423, 1424).

In other words, in FIG. 13, the device should be designed so that the display unit can be inserted in a place where a multi-purpose cover is to be placed.

The display unit has a structure of having both of its corners rounded or obliquely (or diagonally) cut (1413).

When the display unit is folded, a pointer location information input device (1421, 1422) is positioned on an outside of the corners that are rounded or diagonally cut.

When the mobile electronic device is folded, this is to allow the mobile electronic device to be folded while maintaining a thin thickness without being interrupted by the pointer location information input device (1421,1422).

At this point, as described above, a mode shift unit and a pointer execution command unit may be located outside the text input area on a side surface of the human interface device, or the mode shift unit may be located on a side surface outside the text input area, and the pointer execution command unit may be operated as at least one of the text input buttons, or both the mode shift unit and the pointer execution command unit may be operated as at least one of the text input buttons.

Furthermore, more specifically, the mode shift unit and the pointer execution command unit may be located on an outer lower portion of the text input area. (1425, 1426)

At this point, as shown in FIG. 12, although it is preferable that the mode shift unit and the pointer execution command unit are configured as a single body, the mode shift unit and the pointer execution command unit may also be separately divided and separately located.

At this point, in case the mode shift unit or the pointer execution command unit is located on the outer lower portion of the text input area, in case the user places his (or her) hand in order to control the mode shift unit or the pointer execution command unit, in order to prevent the pointer location information input device (1421, 1422) from malfunctioning as the user has inputted the location information of the pointer, the pointer location information input area should be configured while excluding the area where the mode shift unit or the pointer execution command unit is located.

In order to do so, by adjusting an area being covered by an optical signal, which is generated from the pointer location information input device, the optical signal may be designed to not reach the mode shift unit or the pointer execution command unit.

Alternatively, in order to prevent the camera from receiving an optical signal that is generated by a reflection or interference or blockage between the user's finger, which is placed on the mode shift unit or the pointer execution command unit, and the optical signal, an optical signal receiving angle of the camera may be adjusted, or the camera may be configured to disregard the optical signal being received from the corresponding direction.

The mobile electronic device is designed to include an absorbing plate or reflecting plate for absorbing or reflecting a light source, which is generated from the pointer location information input device, on at least three corner portions.

At this point, when two surfaces are located on side surfaces of the human interface device (1423, 1424) and when one surface has the display unit opened within a predetermined angle from a surface where the display unit touches the human interface device, in order to allow the light source, which is generated from the pointer location information input device (1421, 1422), to be sufficiently reflected or absorbed, the reflector or the absorber may be located in a predetermined area (1412) of the display unit corner.

In FIG. 14, the display unit may be configured of a flexible display unit, wherein the flexible display unit covers a text input area of the multi human interface device, and, by being bent, the flexible display unit may be fixed to be wrapped around [or to envelop] the bottom surface of the human interface device.

Additionally, in FIG. 14, the display unit may be replaced with the multi-purpose cover, which is described above in FIG. 13, and an absorber or reflector may be located on the corner portions of the multi-purpose cover, which are contacting the multi human interface device, and, due to a hinge, the multi-purpose cover may be tilted to rear surface (or backward), so as to be used for the purpose of adjusting the height of the human interface device.

FIG. 15 illustrates an exemplary embodiment applying a low-positioned pointer location information input device and a low-positioned pointer execution command unit.

The human interface device includes a text input unit (1501) comprising a plurality of physical buttons, a pointer location information input unit configured to receive information related to a pointer location from a user, a pointer execution command receiving unit configured to receive a signal of a pointer execution command unit (1505, 1506) receiving a command of the user to perform at least one function at the pointer location, a mode shift command receiving unit configured to receive a signal of the mode shift unit shifting to a pointer location information input mode, a pointer location information transmitting unit configured to transmit the information related to the pointer location, which is inputted to the pointer location information input unit, to a digital device being connected to the human interface device via wired or wireless connection. A pointer location information input area of the pointer location information input unit is located to be parallel to an upper surface of at least a portion of a text input area of the text input unit, which comprises a plurality of physical buttons, and wherein the pointer location information input unit includes an optical signal reflector or absorber (1503*a*, 1503*b*, 1503*c*), which is formed to be higher than a height of the text input unit, on first to third surfaces (1502*a*, 1502*b*, 1502*c*) enveloping the text input unit, and wherein a fourth surface (1502*d*) enveloping the text input unit is formed to be lower than the heights of the first to third surfaces, and wherein the fourth surface may include the pointer execution command unit (1505, 1506).

Each of the first surface and the third surface may be respectively located on a left side and a right side of the text input unit, and the second surface may be located on an upper side of the text input unit, and the fourth surface may be located on a lower side of the text input unit.

The pointer location information input unit includes at least two sensor modules, and the two sensor modules may be respectively located on a lower left side corner area and a lower right side corner area of the text input unit. The mode shift unit is operated by a first input of the user that is inputted via a first button, and the pointer execution command receiving unit may be operated by a second input of the user that is inputted via the first button.

The first button may be configured of a material that can detect an electrical signal generated by the touch of a finger, and the first input may be generated by recognizing the electrical signal.

While the first input is maintained, the device is operated in the pointer location information input mode, and, when the first input is released (or cancelled), the pointer location information input mode may be cancelled, and the first input may be generated by physical pressure.

The mode shift unit may be operated by a second input of the user that is inputted to a second button, and, when the second input is inputted 1 time, in case the pointer location information input mode is in a cancelled state, the corresponding mode may be activated, and, in case the pointer location information input mode is activated, the corresponding mode may be cancelled.

FIG. 1 to FIG. 15 collectively describe an example of a multi human interface device, which is to be described in the present invention, which will not be limited only to each of the exemplary embodiments described above, and the technical features and characteristics that are described in the above-described exemplary embodiment may be applied to other exemplary embodiments that are described above. Additionally, the types and used technologies of the text input device pointing location information input device that are included herein may be changed and/or replaced without having the essential purpose modified or changed by anyone skilled in the art.

MODE FOR CARRYING OUT THE INVENTION

As described above, related details have been described in a best mode for carrying out the invention.

INDUSTRIAL APPLICABILITY

As described above, the present invention may be fully or partially applied to a multi human interface device including a text input device and a pointer location information input device.

What is claimed is:

1. A mobile electronic device comprising:
   a text input unit comprising a plurality of physical buttons;
   a left motion detection area formed on a surface of the physical buttons;
   a right motion detection area formed on the surface of the physical buttons;
   a right button configured to activate or deactivate the left motion detection area and to execute a first function at a first pointer location, wherein the right button is provided in a first area separate from the text input unit, the right button comprises a first capacitive touch sensor for detecting a first user touch input and the left motion detection area is activated while the first user touch input is maintained without mechanically pressing the right button, and the first function at the first pointer location is executed when the right button is mechanically pressed;
   a left button configured to activate or deactivate the right motion detection area and to execute a second function at a second pointer location, wherein the left button is provided in a second area separate from the text input unit, the left button comprises a second capacitive touch sensor for detecting a second user touch input and the right motion detection area is activated while the second user touch input is maintained without mechanically pressing the left button, and the second function at the second pointer location is executed when the left button is mechanically pressed; and
   a communication unit configured to transmit information indicating the first and second pointer locations to an external digital device.

2. The mobile electronic device of claim 1, wherein the left motion detection area is permanently activated without maintaining the first user touch input while the right button is locked.

3. The mobile electronic device of claim 1, wherein the right motion detection area is permanently activated without maintaining the second user touch input while the left button is locked.

4. The mobile electronic device of claim 1, wherein the left and right motion detection areas are permanently activated without maintaining the first and second touch inputs while the right and left buttons are locked.

5. The mobile electronic device of claim 1, further comprising a full motion detection area formed on the surface of the physical buttons, wherein the full motion detection area includes at least a part of the left motion detection area and at least a part of the right motion detection area.

6. The mobile electronic device of claim 5, further comprising a third button configured to activate or deactivate the full motion detection area and to execute a third function at a third pointer location.

7. The mobile electronic device of claim 6, wherein the full motion detection area is permanently activated while the third button is locked.

\* \* \* \* \*